US011915699B2

(12) United States Patent
Trapp et al.

(10) Patent No.: US 11,915,699 B2
(45) Date of Patent: *Feb. 27, 2024

(54) ACCOUNT ASSOCIATION WITH DEVICE

(71) Applicant: Amazon Technologies, Inc., Seattle, WA (US)

(72) Inventors: Szymon Grzegorz Trapp, Seattle, WA (US); Martin Patrick Butler, Seattle, WA (US); Manikanta Babu Karanam, Bothell, WA (US); Nicholas Jeffrey Anderson, Seattle, WA (US); Boya Hu, Seattle, WA (US); Zhengyang Wu, Kenmore, WA (US); Fnu Palak, Seattle, WA (US); James Marlotte, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,485

(22) Filed: Mar. 11, 2022

(65) Prior Publication Data
US 2022/0199085 A1    Jun. 23, 2022

Related U.S. Application Data

(63) Continuation of application No. 16/708,150, filed on Dec. 9, 2019, now Pat. No. 11,308,957.
(Continued)

(51) Int. Cl.
*G10L 15/22* (2006.01)
*G10L 17/24* (2013.01)
(Continued)

(52) U.S. Cl.
CPC .............. *G10L 15/22* (2013.01); *G10L 17/24* (2013.01); *H04W 12/06* (2013.01); *H04W 12/37* (2021.01);
(Continued)

(58) Field of Classification Search
CPC ... G10L 2015/227; G10L 17/24; G10L 15/22; G10L 2015/223; G10L 17/00;
(Continued)

(56) References Cited

U.S. PATENT DOCUMENTS 9,728,188 B1 *  8/2017  Rosen ..................... G10L 25/51
9,812,128 B2 * 11/2017  Mixter .................... G10L 15/22
(Continued)

FOREIGN PATENT DOCUMENTS

WO    WO2016073028 A1    5/2016
WO       2019051214 A1    3/2019
WO       2021061722 A1    4/2021

OTHER PUBLICATIONS

Great Britain Office Action dated Nov. 4, 2022 for Great Britain Patent Application No. 2202597.7, a foreign counterpart to U.S. Pat. No. 11,308,957, 5 pages.
(Continued)

*Primary Examiner* — Vijay B Chawan
(74) *Attorney, Agent, or Firm* — Lee & Hayes, P.C.

(57) ABSTRACT

Systems and methods for account data association with voice interface devices are disclosed. For example, when a host user/primary user and guest user have consented for account data to be associated with the primary user's devices, a request to associate the account data may be received. Voice and device-based authentication may be performed to confirm the identity of the guest user and the guest user's account data may be associated with the primary user's devices. During a guest session, voice recognition may be utilized to determine if a given user utterance is from the guest user or the primary user, and actions may be performed by the voice interface device accordingly.

20 Claims, 16 Drawing Sheets

Related U.S. Application Data

(60) Provisional application No. 62/905,112, filed on Sep. 24, 2019.

(51) Int. Cl.
*H04W 12/06* (2021.01)
*H04W 12/37* (2021.01)
*H04W 76/15* (2018.01)

(52) U.S. Cl.
CPC ....... *H04W 76/15* (2018.02); *G10L 2015/223* (2013.01); *G10L 2015/227* (2013.01)

(58) Field of Classification Search
CPC ... G10L 13/00; G10L 2015/088; G10L 25/51; G10L 15/08; G10L 15/1815; G10L 15/20; G10L 15/26; G10L 15/30; G10L 15/32; G10L 17/22; G10L 19/08; G10L 2021/02161; G10L 2025/783; G10L 21/0232; G10L 25/18; G10L 25/60; G10L 25/84
See application file for complete search history.

(56) References Cited

U.S. PATENT DOCUMENTS

| | | | | |
|---|---|---|---|---|
| 10,089,981 | B1* | 10/2018 | Elangovan | G10L 15/22 |
| 10,283,138 | B2* | 5/2019 | Mixter | G10L 15/08 |
| 10,536,287 | B1* | 1/2020 | Leblang | G10L 15/22 |
| 10,841,756 | B1* | 11/2020 | Sathyanarayana Rao | H04W 4/023 |
| 10,911,596 | B1* | 2/2021 | Do | G10L 17/00 |
| 11,070,644 | B1* | 7/2021 | Teng | H04L 67/306 |
| 2016/0132205 | A1* | 5/2016 | Ramakrishnan | G06F 3/04817 715/765 |
| 2019/0066670 | A1* | 2/2019 | White | G10L 15/28 |
| 2020/0380983 | A1* | 12/2020 | Sundaram | G16Y 40/35 |
| 2020/0380996 | A1* | 12/2020 | Alsina | G10L 17/22 |
| 2020/0382513 | A1* | 12/2020 | Biswas | H04L 67/306 |
| 2021/0090561 | A1* | 3/2021 | Trapp | H04W 12/06 |
| 2021/0090578 | A1 | 3/2021 | Trapp et al. | |

OTHER PUBLICATIONS

United Kingdom Office Action dated Jun. 7, 2023 for United Kingdom Patent Application No. 2202597.7, a foreign counterpart to U.S. Pat. No. 11,308,957, 5 pages.

International Preliminary Report on Patentability for PCT Application No. PCT/US20/52144, dated Apr. 7, 2022, 9 pages.

Notice of Allowance for U.S. Appl. No. 16/708,229, dated Mar. 10, 2022, Trapp, "Alexa Roaming Authentication Techniques", 24 pages.

Indian Office Action dated Sep. 20, 2022 for Indian Patent Application No. 202217020796, a foriegn counterpart to U.S. Pat. No. 11,308,957, 7 pages.

Office Action for U.S. Appl. No. 16/708,150, dated Aug. 17, 2021, Trapp, "Account Association With Device", 9 pages.

PCT Search Report and Written Opinion dated Jan. 22, 2021 for PCT application No. PCT/US20/52144, 13 pages.

Great Britain Office Action dated Dec. 13, 2023 for United Kingdom Application No. 2202597.7, a foreign counterpart to U.S. Pat. No. 11,308,957, 9 pages.

\* cited by examiner

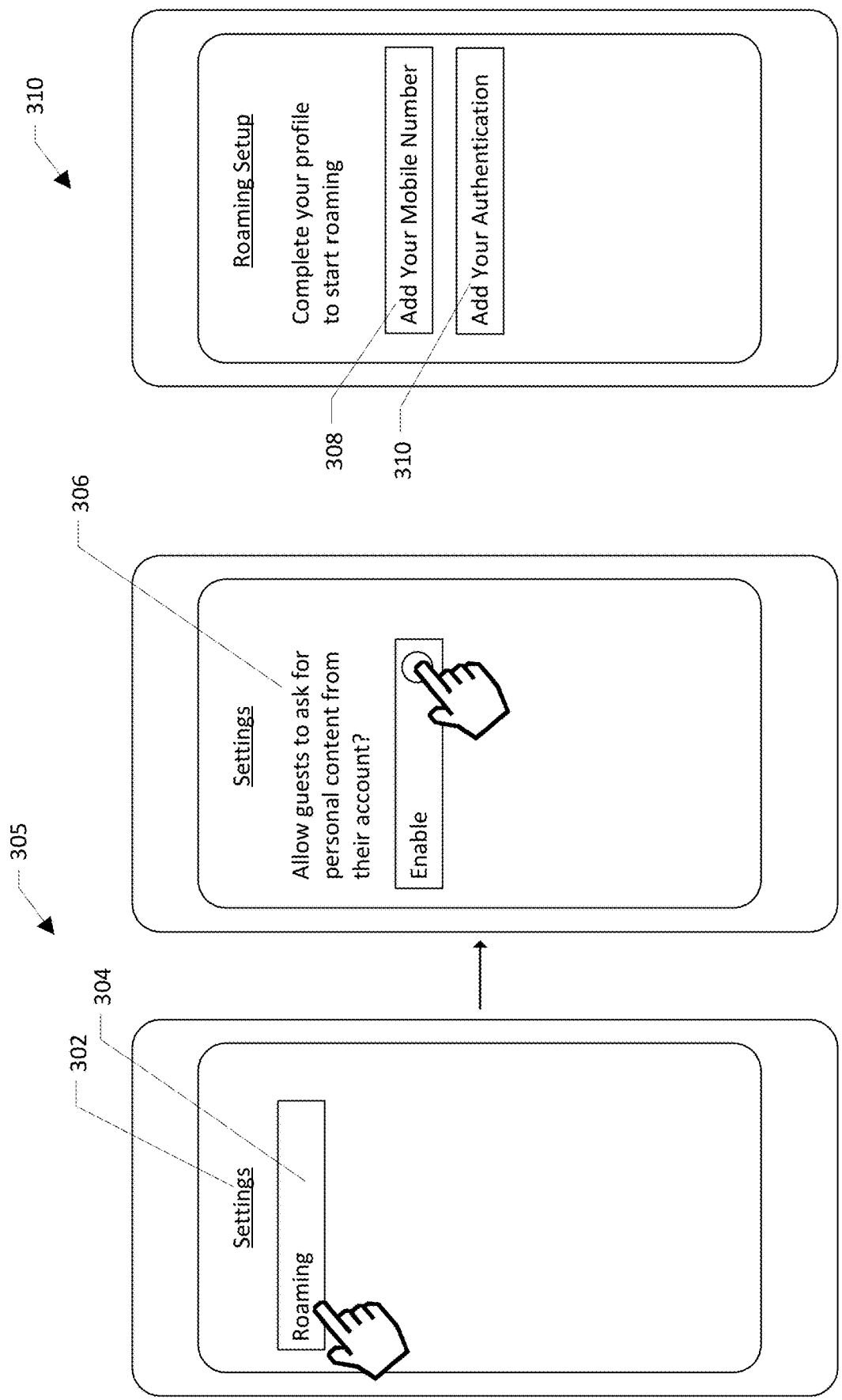

```
800
```

┌─────────────────────────────────────────────────────────────────┐
│ Receive request data to associate first account data with first device associated with │
│ second account data, first account data differing from second account data │
│ 802 │
└─────────────────────────────────────────────────────────────────┘
                                    ↓
┌─────────────────────────────────────────────────────────────────┐
│ Determine that first voice profile corresponding to request data is associated with first │
│ account data │
│ 804 │
└─────────────────────────────────────────────────────────────────┘
                                    ↓
┌─────────────────────────────────────────────────────────────────┐
│ Cause, based at least in part on determining that first voice profile is associated with │
│ first account data, first account data to be associated with first device │
│ 806 │
└─────────────────────────────────────────────────────────────────┘
                                    ↓
┌─────────────────────────────────────────────────────────────────┐
│ Receive, from first device, first audio data representing user utterance to perform │
│ action │
│ 808 │
└─────────────────────────────────────────────────────────────────┘
                                    ↓
┌─────────────────────────────────────────────────────────────────┐
│ Determine that second voice profile associated with first audio data corresponds to │
│ first voice profile │
│ 810 │
└─────────────────────────────────────────────────────────────────┘
                                    ↓
┌─────────────────────────────────────────────────────────────────┐
│ Identify application associated with first account data to perform action │
│ 812 │
└─────────────────────────────────────────────────────────────────┘
                                    ↓
┌─────────────────────────────────────────────────────────────────┐
│ Cause action to be performed utilizing application │
│ 814 │
└─────────────────────────────────────────────────────────────────┘

FIG. 8

ACCOUNT ASSOCIATION WITH DEVICE

RELATED APPLICATIONS

This application claims priority to and is a continuation of U.S. patent application Ser. No. 16/708,150, filed on Dec. 9, 2019, which is a non-provisional application of U.S. Provisional Patent Application No. 62/905,112, filed on Sep. 24, 2019, the entire contents of which are incorporated herein by reference.

BACKGROUND

Voice interface devices may be utilized to provide information and/or to control operation of other electronic devices. The provision of information and control of devices may be performed utilizing accounts associated with the voice interface devices. Described herein are improvements in technology and solutions to technical problems that can be used to, among other things, manage the use of voice interface devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3A illustrates an example user interface for setup of account association with devices by host users.

FIG. 3B illustrates an example user interface for setup of account association with devices by guest users.

FIG. 8 illustrates a flow diagram of another example process for account association with devices.

DETAILED DESCRIPTION

Figure 1:
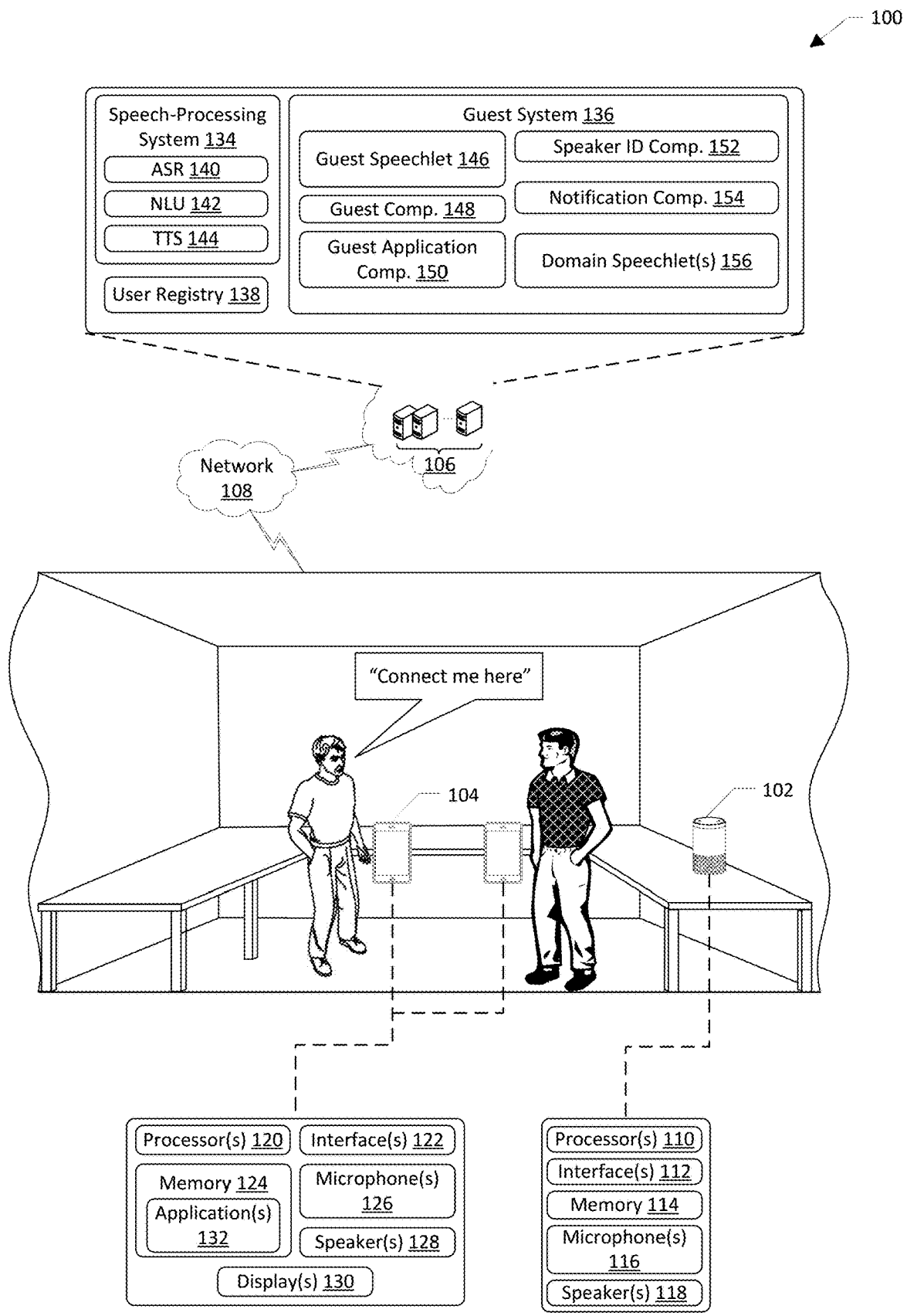
FIG. 1 illustrates a schematic diagram of an example environment for account association with devices.

Systems and methods for account association with devices are disclosed. Take, for example, a first user profile that may be associated with one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. Each user may have his or her own user accounts that may be utilized to operate electronic devices. For example, the first user profile may be associated with first account data that provides access to certain functionality and/or resources utilizing the electronic devices associated with the first user profile, while the second user profile may be associated with second account data that provides access to the same or different functionality and/or resources. By way of example, the first account data may indicate that the first user profile may utilize voice interface devices to receive music, video, podcast, or other type(s) of content from a first streaming service while the second account data may indicate that the second user profile may receive content from a second streaming service. Other functionalities that may be associated with given account data may include the ability to use of applications such as smart-home applications, payment information for shopping/purchases, healthcare information, and/or the use of contact lists for communication purposes, for example. While each user may be able to utilize his or her own voice interface devices, it may be beneficial to allow users to utilize each other's electronic devices in connection with their own accounts.

For example, the first user may be in the environment, such as a home, associated with devices of the second user profile and may desire to utilize the devices to access the music services, news services, and/or to operate smart devices associated with the first user account, for example. To do so, the voice interface devices associated with the second user profile may be associated with the first user's account data such that the first user may utilize the voice interface devices to perform one or more actions. This account data association with voice interface devices may include the first user profile, which may be described herein as the "guest profile," setting up guest functionality, such as by utilizing a voice interface device application residing on and/or accessible by a mobile device associated with the guest user.

The second user profile, which may be described herein as the "host user profile," may also set up the ability to associated account data with his or her devices utilizing an application residing on and/or otherwise accessible to a mobile device associated with the second user. For example, the second user may provide input to the mobile device indicating a request to enable guests on voice interface devices associated with the second user account. This indication may represent consent of the second user to perform the operations described herein. The second user may also indicate which voice interface devices are to be enabled for guest access. Once guest access has been set up in association with the applicable user profiles, the selected voice interface devices and the speech-processing system may be configured to (temporarily or otherwise) associate at least some of the first user's account data and/or functionality with the second user account.

For example, the guest user may provide a user utterance to one or more of the host user profile's voice interface devices indicating an intent to associate the guest user's account data with the voice interface devices. For example, the user may speak the phrase "connect me here." Microphones of the voice interface device may capture this audio, generate corresponding audio data, and send the audio data to a remote system that includes the speech-processing system. The remote system may determine that the user utterance includes the phrase "connect me here" or other word(s)/sound(s), and may utilize a guest speechlet configured to handle performance of operations associated with such an utterance to initiate account data association. In other examples, input data other than audio data may be received that indicates a request to associate account data. In examples, the guest speechlet may query a settings component to determine if the voice interface device is associated with account data that indicates guest access has been enabled utilizing the voice interface device. In this example, the host user has provided consent to enable guest access and the guest speechlet may instruct a guest component to generate a guest session.

The guest speechlet may then be utilized to cause the voice interface devices to output audio representing a request for identifying information of a mobile device associated with the guest user. For example, the audio may include synthesized speech stating "what is your phone number?" The guest user may provide another user utterance that includes the requested identifying information, such as the phone number associated with the mobile device of the guest user. The microphones may capture that audio, generate corresponding audio data, and send the audio data to the remote system. The guest speechlet may receive data indicating the identifying information (e.g., phone number and speaker identification from the sound of the audio data) and may query a user identifier component for account data information associated with the guest user. The user identifier component may utilize the provided phone number to identify the mobile device identifier associated with the guest user and the guest user's account. The user identifier component may provide this information, which may include the guest user's identification, the host user's identification, and/or settings information, to the guest speechlet, which may cause the guest component to initiate the guest session.

The guest component may utilize the information provided by the guest speechlet to query an audio cache for the audio data representing one or more of the user utterances provided by the guest user, such as the audio data representing the phone number requested in the operations above.

The guest component may then query an automatic speech recognition (ASR) component to perform an analysis of the audio data corresponding to the guest user's voice to determine if a voice profile associated with the audio data corresponds to a reference voice profile of the guest user that was generated as part of the guest setup process. The guest component may receive data indicating that voice authentication of the guest user was successful and account data association may continue. It should be understood that while authentication of the guest user as described above includes the use of voice recognition processes, additional and/or different processes may also be utilized, such as facial recognition processes, utilizing SSIDs from personal devices such as wearables, phones, etc., utilizing biometric information other than or in additional to facial recognition, such as eye and/or fingerprint scans, etc.

The guest component may update the guest session to indicate that voice authentication of the guest user is successful and may utilize a workflow component of the remote system to set up a disconnection routine for the guest session. For example, the disconnection routine may include indicating options for when the guest user's account data will be disassociated from the host user's voice interface devices. These options may include, for example, when the remote system determines that a user utterance is received indicating an intent by the guest user and/or the host user to disassociate the guest user's account data from the host user's voice interface devices, when the remote system receives input data, such as via the voice interface device application, from the mobile device of the guest user profile and/or the host user profile indicating a request to disassociate the account data, when another guest session is initiated using the voice interface devices, and/or after the expiration of a predefined amount of time, such as 24 hours for example.

The guest speechlet, having received confirmation that the guest session has started may be utilized to cause the voice interface device to query a notification component of the remote system to generate one or more notifications for sending to the guest user device and/or the host user device. For example, the notification component may be utilized to identify a notification to be output by the voice interface device. The guest speechlet may receive the notification and cause audio corresponding to the notification to be output by the voice interface device. For example, the request may include the phrase "I've sent a message to your mobile device." The notification component may identify and/or generate a message and may send the message to the mobile device, such as by utilizing the phone number provided in the operations above. The message may include a deep link which may cause an alert to be displayed on a screen of the mobile device. The alert may be selectable to cause the voice interface device application to initiate and display the message. The message may include an indication that a guest session has been initiated and may request user input to further authenticate that the user desires to associate his or her account data with the host user's voice interface devices. For example, the user may provide touch input to a portion of the screen displaying a user interface that includes a selectable portion to confirm that the guest user's account data should be associated with the host user's voice interface devices. Data indicating this confirmation may be sent to the guest component, which may determine that two-factor authentication, here voice authentication and confirmation from the voice interface device application, is successful. The guest component may update the guest session to indicate that the two-factor authentication is successful. In other examples, an error may occur during the authentication process utilizing the voice interface device application. For example, the application may be utilized by more than one account holder and in some instances an account other than the one associated with the guest user may be logged in to at the time that the request for verification is received. This may lead to a person identification mismatch, which may cause the application to provide a user interface indicating the mismatch. The guest user may utilize this information to sign out of the other account and sign in to the guest user's account to provide the requested verification. In still other examples, no guest session may be found during this verification process. For example, when a request for verification is sent to the mobile device, the request may be associated with a predefined timeout limit for the verification to occur, such as 10 minutes. If the predefined timeout limit has expired, the guest session may expire, and the mobile device may render a user interface indicating that the guest session has expired.

The guest component may then utilize the notification component to send a notification one or more devices of the host user indicating that a guest user's account data has been associated with the host user's voice interface devices. This may allow the host user to initiate a disassociation process if the host user was not aware that a guest user was connected to his or her devices. The notification component may also be utilized to send a notification to the mobile device associated with the guest user. The guest component may also update timeout information for dissociation of the guest user's account data from the voice interface device. The guest component may also publish a guest session event to an event bus of the remote system, which may be utilized as described below to determine whether subsequent user utterances are associated with the guest user or the host user. At this point, the guest session may be active such that the guest user's account data is associated with the host user's voice interface devices.

Thereafter, users may provide user utterances to the voice interface devices and the remote system may be utilized to determine whether a given user utterance is from the guest user or the host user and perform operations based at least in part on that person identification. For example, one of the users may speak the phrase "play my playlist." Microphones of the voice interface device may capture that audio, generate corresponding audio data, and send the audio data to the remote system for processing. For example, an orchestrator of the remote system may receive data representing the request and may retrieve information about the context of the request. That information may include an indication that a guest session is established for the voice interface device in question and that identification of the user is to be performed to determine a response to the request. The orchestrator may then query the speaker identification component for person identifiers for the host user. The orchestrator may also query the guest component for an identifier of the guest session, and may utilize that identifier of the guest session to query the speaker identification component for person identifiers of the guest user. At this point, the orchestrator may have received the person identifiers for the host user and the guest user, and the orchestrator may build a speaker candidate set indicating the potential speakers of the user utterance.

The orchestrator may then connect to the ASR component and initiate a request for speaker recognition, which may include providing the candidate set to the ASR component. The ASR component may utilize the voice profiles of the candidate speakers to determine which voice profile of the candidate speakers corresponds to characteristics of the user utterance. If the ASR component returns a result that the guest user is the most likely person to have provided the user utterance, then a context associated with the user utterance may be updated to indicate that the user utterance is from the guest user. For example, a natural language understanding component (NLU) may receive context data indicating that the speaker is the guest user and/or that when an intent is determined by the NLU component, the intent may be associated with resources available to the guest user's account. This data may also be sent to one or more skills associated with the guest user's account. The skills may utilize this information to process requests from the NLU component and return results. In examples, updating the context to indicate that the request is associated with the guest user may be performed prior to and/or in parallel with the ASR component determining whether the request is from the guest user or the host user. This may decrease latency in providing a response to the user. However, in these examples, where the ASR component determines that the request is from the host user instead of the guest user, the orchestrator may cause the context associated with the request to be updated to reflect that the speaker is the host user.

Returning to the instances where the speaker is determined to be the guest user, the NLU component may determine an intent associated with the user utterance. Using the example above, for the user utterance of "play my playlist," the NLU component may identify a "play music" intent and may identify the music to be played as "my playlist." The NLU component may utilize the data indicating that the guest user provided the request to determine which music corresponds to the guest user's playlist. For example, the guest user's identification data may be utilized by an entity recognition component to determine which playlist associated with the guest user is being requested for output on the voice interface device. The NLU component may also utilize the guest user's identification data to determine which services are available to the guest user's account, such as which streaming music services are available to facilitate the request to play music. The NLU component may determine one or more speechlets to facilitate the request and may provide information associated with the request to the speechlets for processing. The speechlets may receive the information from the NLU component, may process the request, and may cause the voice interface device to perform one or more actions associated with the request, such as outputting content associated with "my playlist."

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for account data association with devices. The system 100 may include, for example, a voice interface device 102. The voice interface device 102 may be configured to receive audio corresponding to user utterances, generate corresponding audio data, perform operations associated with the user utterances, and output audio to an environment in which the voice interface device 102 is situated, for example. In other examples, the device 102 may not include a voice interface and/or may include an interface other than a voice interface, which may include devices such as televisions, settop boxes, tablets, and/or other devices where given media is made available based on identifying the user after associating the guest account as described herein. For example, the voice interface device 102 may be one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The system 100 may also include one or more mobile devices 104, which may be configured to, among other things, utilize an application 132 associated with the voice interface device 102 to display information to a user and/or to allow for receiving input from the user, such as input for setting up and/or managing use of the voice interface device 102. The system 100 may also include one or more accessory devices (not depicted), which may be configured to be controlled utilizing the voice interface device 102. The accessory devices may include devices such as locks, doorbells, thermostats, speakers, watches, appliances, light bulbs, plugs, clocks, etc. The system 100 may also include a remote system 106 configured to communicate with the voice interface device 102 and/or the mobile device 104, such as via a network 108. The remote system 106 may include a speech-processing system associated with one or more voice interface devices 102. The voice interface devices 102 may be configured to receive user utterances and perform operations in response to such user utterances. In these examples, the voice interface devices 102 may be "hands free" such that interactions with the voice interface devices 102 are performed through audible requests and responses.

The voice interface device 102 may include one or more components, such as, for example, one or more processors 110, one or more network interfaces 112, memory 114, one or more microphones 116, and/or one or more speakers 118. The microphones 116 may be configured to capture audio, such as user utterances, and generate corresponding audio data. The speakers 118 may be configured to output audio, such as audio corresponding to audio data received from another device and/or the system 106. It should be understood that while several examples used herein include a voice interface device 102 that allows users to interact therewith via user utterances, one or more other devices, which may not include a voice interface, may be utilized instead of or in addition to voice interface devices 102. In these examples, the device may be configured to send and receive data over the network 108 and to communicate with other devices in the system 100. As such, in each instance where a voice interface device is utilized, a computing device that does not include a voice interface may also or alternatively be used.

The mobile device 104 may include one or more components, such as, for example, one or more processors 120, one or more network interfaces 122, memory 124, one or more microphones 126, one or more speakers 128, and/or one or more displays 130. The microphones 126 and the speakers 128 may have the same or similar components and/or may operate in the same or a similar manner to the microphones 116 and the speakers 118 of the voice interface device 102, respectively. The displays 130 may be configured to present information and user interfaces to a user of the mobile device 104. The displays 130 may also include input functionality, such as a touchscreen, that may allow for user input to be received. The memory 124 may include one or more components such as, for example, a voice interface device application 132, which may reside on the memory 124 and/or be accessible to the mobile device 104. The application 132 may be configured to cause the processor(s) 120 to receive information associated with interactions with the voice interface device 102 and cause display of representations, such as text and/or images, associated with the interactions. The application 132 may also be utilized, in examples, to receive input data, such as from a user of the mobile device 104, and send the input data and/or instructions associated with the input data to the remote system 106. The application 132 may also be utilized to display notifications and/or alerts received, for example, from the remote system 106.

The remote system 106 may include components such as, for example, a speech-processing system 134, a guest system 136, and/or a user registry 138. It should be understood that while the speech-processing system 134, the guest system 136, and the user registry 138 are depicted as separate from each other in FIG. 1, some or all of the components may be a part of the same system. The speech-processing system 134 may include an automatic speech recognition component (ASR) 140, a natural language understanding component (NLU) 142, and/or a text-to-speech component (TTS) 144. The guest system 136 may include one or more components such as, for example, a guest speechlet 146, a guest component 148, a guest application 150, a speaker identification component 152, a notification component 154, and/or one or more domain speechlets 156. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills, actions, and/or capsules. For example, a skill may receive data representing an intent. For example, an intent may be determined by the NLU component 142 and/or as determined from user input via a computing device. Skills may be configured to utilize the intent to output data for input to the TTS component 144, a link or other resource locator for audio data, and/or a command to a device, such as the voice interface device 102.

In instances where a voice interface device 102 is utilized, skills may extend the functionality of smart devices that can be controlled by users utilizing a voice-user interface. In some examples, skills may be a type of application that may be useable in association with smart devices and may have been developed specifically to work in connection with given smart devices. Additionally, skills may be a type of application that may be useable in association with an electronic device and may have been developed specifically to provide given functionality to the electronic device. In examples, a non-skill application may be an application that does not include the functionality of a skill. Speechlets, as described herein, may be a type of application that may be usable in association with electronic devices and may have been developed specifically to work in connection voice interfaces of with electronic devices. The application(s) may be configured to cause processor(s) to receive information associated with interactions with the voice interface device 102. The application(s) may also be utilized, in examples, to receive input, such as from a user of the mobile device 104, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system 134 may include and/or be associated with processor(s), network interface(s), and/or memory. The guest system 136 may include and/or be associated with different processor(s), network interface(s), and/or memory, or one or more of these components may utilize some or all of the same processor(s), network interface(s), and/or memory utilized by the speech-processing system 134. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The components of the remote system 106 as outlined above will now be described with reference to several examples. It should be understood that the examples provided herein are for illustration and should not be construed as a limitation of this disclosure. In examples, a first user may travel to an environment, such as a home, of a second user's devices and may desire to utilize the second user's devices to access the music services, news services, and/or to operate smart devices associated with the first user's account. To do so, the voice interface devices associated with the second user's account may be associated with the first user's account data such that the first user profile may utilize the interface devices of the second user's account to perform one or more actions. This account data association with voice interface devices may include the first user, which may be described herein as the "guest user," setting up guest functionality, such as by utilizing the voice interface device application 132 residing on and/or accessible by the mobile device 104 associated with the guest user. Setting up guest functionality may include, for example, providing input corresponding to an identifier of the mobile device 104, such as a phone number associated with the mobile device 104, and initiating voice-profile training operations that may allow the remote system 106 associated with the voice interface device 102 to generate a voice profile associated with the guest user. The voice-profile training operations may include presenting instructions for the user to provide user utterances that may be captured by microphones 126 of the mobile device 104. The user utterances may be specific phrases that may be utilized to acquire distinctive characteristics of the user's voice. Corresponding audio data may be generated and may be sent to the remote system 106, which may analyze the audio data to determine the distinctive characteristics of the user's voice. The characteristics may include, for example, speech phrasing, emphasis, timing, voice intensity, etc.

The second user, which may be described herein as the "host user," may also set up the ability to associated account data with his or her voice interface devices utilizing an instance of the voice interface device application 132 residing on and/or accessible to a mobile device associated with the second user account. For example, the second user may provide input to the mobile device indicating a request to enable guest access on voice interface devices associated with the second user's account. This indication may represent consent of the second user to perform the operations described herein. Once guest access has been set up by the guest user account and the host user account, the voice interface devices 102 and the speech-processing system 134 may be configured to associate the guest user account data with the host interface devices.

For example, the guest user may provide a user utterance to one or more of the host user's voice interface devices 102 indicating an intent to associate the guest user's account data with the voice interface devices 102. For example, the user may speak the phrase "connect me here." Microphones 116 of the voice interface device 102 may capture this audio, generate corresponding audio data, and send the audio data to the remote system 106 that includes the speech-processing system 134. The remote system 106 may determine that the user utterance includes the phrase "connect me here" or a similar phrase, and may utilize guest speechlet 146 configured to handle performance of operations associated with such an utterance to initiate account data association. For example, the guest speechlet 146 may query a settings component to determine if the voice interface device 102 is associated with account data that indicates guest access has been enabled utilizing the voice interface device 102. In this example, the host user has provided consent to enable guest access and the guest speechlet 146 may instruct a guest component 148 to generate a guest session.

The guest speechlet 148 may then be utilized to cause the voice interface devices 102 to output audio representing a request for identifying information of a mobile device 104 associated with the guest user. For example, the audio may include synthesized speech stating "what is your phone number?" The guest user may provide another user utterance that includes the requested identifying information, such as the phone number associated with the mobile device 104 of the guest user. The microphones 116 may capture that audio, generate corresponding audio data, and send the audio data to the remote system 106. The guest speechlet 146 may receive data indicating the identifying information and may query a person-identification component for account data information associated with the guest user. The person-identification component may utilize the provided phone number to determine the mobile device identifier associated with the guest user and the guest user's account. The person-identification component may provide this information, which may include the guest user's identification, the host user's identification, and/or settings information, to the guest speechlet 146, which may cause the guest component to initiate the guest session.

The guest component 148 may utilize the information provided by the guest speechlet 146 to query a speaker identification component 152 for the voice profile(s) associated with the guest user. The guest component 148 may also query an audio cache for the audio data representing one or more of the user utterances provided by the guest user, such as the audio data representing the phone number requested in the operations above. The guest component 148 may then use that an automatic speech recognition (ASR) component 140 perform an analysis of the audio data corresponding to the guest user's voice to determine if a voice profile associated with the audio data corresponds to the reference voice profile of the guest user that was generated as part of the guest setup process. The ASR component 140 may compare the characteristics of the audio data with the characteristics of the reference voice profile to determine whether the characteristics correspond to each other, such as to a threshold degree of confidence.

The generation of voice profiles and comparison of user utterances to voice profiles may be performed in multiple ways. For example, the remote system 106 may determine speech characteristics representing user input. The system 106 may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system 106 perform different actions), the different inputs of the user may have similar or identifying speech characteristics (e.g., pitch, tone, etc.). Thus, when the system generates a voice profile, otherwise described herein as a voice profile, by clustering the user inputs having the same or similar speech characteristics, the system is effectively generating a voice profile specific to a user even though the system 106 does not know which user provided the inputs. This type of voice profile may be referred to as an anonymous voice profile as it is not associated with a user identifier representing a known user to the system.

The system 106 may use clustering techniques to update voice profiles over time. When the system 106 receives audio data representing a spoken user input, the system 106 may store the audio data along with a user identifier, which may represent a user that spoke the input, and/or a device identifier, which may represent a device that captured the input. Periodically, the system 106 may recall, from storage, audio data, such as that representing previous user inputs, associated with a particular user identifier, device identifier, group of user identifiers, which may be associated with a same household or communal profile, or group of device identifiers, which may be associated with a same household profile.

The system 106 may identify clusters of the audio data, with each cluster including similar or identical speech characteristics. The system may determine a cluster is substantially similar to an existing explicit or anonymous voice profile. If this occurs, the system may add the cluster of audio data to the similar explicit or anonymous voice profile. Adding the cluster to the existing voice profile effectively updates the existing voice profile to account for changed speech characteristics of the user represented in the cluster of audio data.

In addition to or instead of performing clustering to determine whether audio data representing user inputs is similar to an existing voice profile, the system may leverage various context signals to label specific audio data as being associated with a particular user identifier and by extension a particular existing voice profile. For example, when a user speaks a user input, the system 106 may not be confident in recognizing the user's speech. After the user speaks the user input, the user may further interact with the system 106 to provide the system 106 with further information needed to perform an action responsive to the user input. Such further information may include non-spoken user verification information, such as user login information to a particular service of the system 106, etc. Based on such user verification information, the system 106 may label the previously spoken user input to indicate it originated from the particular user. For example, the system 106 may associate audio data, representing the previous spoken user input, with a user identifier corresponding to the user.

System usage history may also or alternatively be used to retroactively associate audio data, representing a spoken user input, with a particular user. For example, a user may speak a user input requesting the output of a particular type of music. The system 106 may maintain a record of user inputs received with respect to a group of user identifiers. The system 106 may process the record of previous user inputs to identify patterns, such as which user identifiers are routinely associated with requests for particular types of music. For example, the system 106 may identify that a first user identifier of the group profile routinely requests the output of jazz music, a second user identifier of the group profile routinely requests the output of classical music, etc. Based on the identified patterns, the system 106 may determine it is likely that the current user input was spoken by a particular user, and may associate audio data (representing the user input) with the user's user identifier.

The ASR component 140 may perform user recognition using various data including user recognition feature vector data, feature vectors representing explicit and/or anonymous voice profiles, ASR confidence data, and/or other data. While details on user recognition are provided here with respect to FIG. 1, additional details on user recognition are described below with respect to FIGS. 13-15. Additionally, when the ASR component 140 is described as performing user recognition, the same or similar functionality may be performed by the user recognition engine described more fully with respect to FIGS. 9 and 13-15. The ASR component 140 may output the user recognition data, which reflects a certain confidence that the user input was spoken by one or more particular users. The user recognition data may include one or more user identifiers (e.g., corresponding to one or more explicit voice profiles and/or one or more anonymous voice profiles). Each user identifier in the user recognition data may be associated with a respective confidence value, representing a likelihood that the user input corresponds to the user identifier. A confidence value may be a numeric or binned value.

The feature vector(s) input to the ASR component 140 may correspond to one or more anonymous voice profiles and/or one or more explicit voice profiles. The ASR component 140 may use the feature vector(s) to compare against a user recognition feature vector, representing the present user input, to determine whether the user recognition feature vector corresponds to one or more of the feature vectors of the anonymous and/or explicit voice profiles.

Each feature vector may be the same size as the user recognition feature vector. For example, if the user recognition feature vector is of size F (for example encoded by an encoder), a feature vector may also be of size F.

To perform user recognition, the ASR component 140 may determine the device from which the audio data originated. For example, the audio data may be associated with metadata including a device identifier representing the device. Either the device or the system(s) 120 may generate the metadata. The system(s) 106 may determine a group profile identifier associated with the device identifier, may determine user identifiers associated with the group profile identifier, and may include the group profile identifier and/or the user identifiers in the metadata. In other examples, the guest component 148 may provide a candidate list of profile identifiers based at least in part on a guest session being active with respect to the voice interface device 102 in question. The system(s) 106 may associate the metadata with the user recognition feature vector produced from the audio data. The ASR component 140 may send a signal to voice profile storage, with the signal requesting only audio data and/or feature vectors (depending on whether audio data and/or corresponding feature vectors are stored) associated with the device identifier, the group profile identifier, and/or the user identifiers represented in the metadata. This limits the universe of possible feature vectors the ASR component 140 considers at runtime and thus decreases the amount of time to perform user recognition processing by decreasing the amount of feature vectors needed to be processed. Alternatively, the ASR component 140 may access all (or some other subset of) the audio data and/or feature vectors available to the ASR component 140. However, accessing all audio data and/or feature vectors will likely increase the amount of time needed to perform user recognition processing based on the magnitude of audio data and/or feature vectors to be processed.

If the ASR component 140 receives audio data from the voice profile storage, the ASR component 140 may generate one or more feature vectors corresponding to the received audio data.

The ASR component 140 may attempt to identify the user that spoke the speech represented in the audio data by comparing the user recognition feature vector to the reference feature vector(s). The ASR component 140 may include a scoring component that determines respective scores indicating whether the user input (represented by the user recognition feature vector) was spoken by one or more particular users (represented by the reference feature vector(s)). The ASR component 140 may also include a confidence component that determines an overall accuracy of user recognition processing (such as those of the scoring component) and/or an individual confidence value with respect to each user potentially identified by the scoring component. The output from the scoring component may include a different confidence value for each received feature vector. For example, the output may include a first confidence value for a first feature vector (representing a first anonymous or explicit voice profile), a second confidence value for a second feature vector (representing a second anonymous or explicit voice profile), etc.

The scoring component and the confidence component may implement one or more trained machine learning models (such neural networks, classifiers, etc.). For example, the scoring component may use probabilistic linear discriminant analysis (PLDA) techniques. PLDA scoring determines how likely it is that the user recognition feature vector corresponds to a particular reference feature vector. The PLDA scoring may generate a confidence value for each reference feature vector considered and may output a list of confidence values associated with respective user identifiers, anonymous voice profile identifiers, and/or explicit voice profile identifiers. The scoring component may also use other techniques, such as GMMs, generative Bayesian models, or the like, to determine confidence values.

The confidence component may input various data including information about the ASR confidence, speech length (e.g., number of frames or other measured length of the user input), audio condition/quality data (such as signal-to-interference data or other metric data), fingerprint data, image data, or other factors to consider how confident the ASR component 140 is with regard to the confidence values linking users to the user input. The confidence component may also consider the confidence values and associated identifiers output by the scoring component. For example, the confidence component may determine that a lower ASR confidence, or poor audio quality, or other factors, may result in a lower confidence of the ASR component 140. Whereas a higher ASR confidence, or better audio quality, or other factors, may result in a higher confidence of the ASR component 140. Precise determination of the confidence may depend on configuration and training of the confidence component and the model(s) implemented thereby. The confidence component may operate using a number of different machine learning models/techniques such as GMM, neural networks, etc. For example, the confidence component may be a classifier configured to map a score output by the scoring component to a confidence value.

The ASR component 140 may output user recognition data specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the ASR component 140 may output user recognition data with respect to each received reference feature vector. The user recognition data may include numeric confidence values (e.g., 0.0-1.0, 0-1000, or whatever scale the system is configured to operate). Thus, the user recognition data may output an N-best list of potential users with numeric confidence values (e.g., user identifier—0.2, anonymous voice profile identifier—0.8). Alternatively, or in addition, the user recognition data may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The ASR component 140 may output an N-best list of potential users with binned confidence value (e.g., user identifier—low, anonymous voice profile identifier—high). Combined binned and numeric confidence value outputs are also possible. Rather than a list of identifiers and their respective confidence values, the user recognition data may only include information related to the top scoring identifier as determined by the ASR component 140. The ASR component 140 may also output an overall confidence value that the individual confidence values are correct, where the overall confidence value indicates how confident the ASR component 140 is in the output results. The overall confidence value may be determined by the confidence component.

The confidence component may determine differences between individual confidence values when determining the user recognition data. For example, if a difference between a first confidence value and a second confidence value is large, and the first confidence value is above a threshold confidence value, then the ASR component 140 is able to recognize a first user profile (associated with the reference feature vector associated with the first confidence value) as the user that spoke the user input with a much higher confidence than if the difference between the confidence values were smaller.

The ASR component 140 may perform thresholding to avoid incorrect user recognition data being output. For example, the ASR component 140 may compare a confidence value output by the confidence component to a threshold confidence value. If the confidence value does not satisfy (e.g., does not meet or exceed) the threshold confidence value, the ASR component 140 may not output user recognition data, or may only include in that data an indicator that a user speaking the user input could not be recognized. Further, the ASR component 140 may not output user recognition data until enough user recognition feature vector data is accumulated and processed to verify a user above a threshold confidence value. Thus, the ASR component 140 may wait until a sufficient threshold quantity of audio data of the user input has been processed before outputting user recognition data. The quantity of received audio data may also be considered by the confidence component.

The ASR component 140 may be defaulted to output binned (e.g., low, medium, high) user recognition confidence values. However, such may be problematic in certain situations. For example, if the ASR component 140 computes a single binned confidence value for multiple feature vectors, the system may not be able to effectively determine which user originated the user input. In this situation, the ASR component 140 may be configured to override its default setting and output numeric confidence values. This enables the system to determine a user, associated with the highest numeric confidence value, originated the user input.

The ASR component 140 may use other data to inform user recognition processing. A trained model(s) or other component of the ASR component 140 may be trained to take other data as an input feature when performing user recognition processing. Other data may include a variety of data types depending on system configuration and may be made available from other sensors, devices, or storage. The other data may include a time of day at which the audio data was generated by the device 102 or received from the device 102, a day of a week in which the audio data audio data was generated by the device 102 or received from the device 102, etc.

The other data may include image data or video data. For example, facial recognition may be performed on image data or video data received from the device 102 from which the audio data was received (or another device). The output of facial recognition processing may be used by the ASR component 140. That is, facial recognition output data may be used in conjunction with the comparison of the user recognition feature vector and one or more reference feature vectors to perform more accurate user recognition processing.

The other data may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data was received is a smart watch or vehicle belonging to a user A, the fact that the device 102 belongs to user A may increase a user recognition confidence value associated with user A and/or decrease a user recognition confidence value associated with user B.

The other data may include geographic coordinate data associated with the device 102. For example, a group profile associated with a vehicle may indicate multiple users (e.g., user A and user B). The vehicle may include a global positioning system (GPS) indicating latitude and longitude coordinates of the vehicle when the audio data is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data may include data representing activity of a particular user that may be useful in performing user recognition processing. For example, if a user has recently entered a code to disable a home security alarm, and the audio data was received from a device 102 represented in a group profile associated with the home, signals from the home security alarm about the disabling user, time of disabling, etc. may be reflected in the other data and considered by the ASR component 140. If a mobile device (such as a smart phone, Tile, dongle, or other device) known to be associated with a particular user is detected proximate to (for example physically close to, connected to the same WiFi network as, or otherwise nearby) the device 102, this may be reflected in the other data and considered by the ASR component 140.

Depending on system configuration, the other data may be configured to be included in the user recognition feature vector data (for example using an encoder) so that all the data relating to the user input to be processed by the scoring component may be included in a single feature vector. Alternatively, the other data may be reflected in one or more different data structures to be processed by the scoring component.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

In examples where the characteristics of the reference voice profile for the guest user corresponds to the characteristics of the voice profile of the received user utterance, the ASR component 140 may return data to the guest component 148 indicating that voice authentication of the guest user was successful and account data association may continue. It should be understood that while authentication of the guest user as described above includes the use of voice recognition techniques, additional and/or different techniques may also be utilized, such as facial recognition techniques in instances where the voice interface device 102 and/or another associated device includes a camera and the guest user has consented to the capture of images of the guest user for authentication purposes.

The guest component 148 may update the guest session to indicate that voice authentication of the guest user is successful and may utilize a workflow component of the remote system 106 to set up a disconnection routine for the guest session. For example, the disconnection routine may include indicating options for when the guest user's account data will be disassociated with the host user's voice interface devices 102. These options may include, for example, when the remote system 106 determines that a user utterance is received indicating an intent by the guest user and/or the host user to disassociate the guest user's account data from the host user's voice interface devices 102, when the remote system 106 receive input data, such as via the voice interface device application 132, from the mobile device 104 of the guest user and/or the host user indicating a request to disassociate the account data, when another guest session is initiated using the voice interface devices 102, and/or after the expiration of a predefined amount of time, such as 24 hours for example.

The guest speechlet 146, having received confirmation that the guest session has started may be utilized to cause the voice interface device 102 to query the notification component 154 of the remote system 106 to generate one or more notifications for sending to the guest user and/or the host user. For example, the notification component 154 may be utilized to identify a request to be output by the voice interface device 102. The guest speechlet 146 may receive the request and cause audio corresponding to the request to be output by the voice interface device 102. For example, the request may include the phrase "I've sent a message to your mobile device." The notification component 154 may identify and/or generate a message and may send the message to the mobile device 104, such as by utilizing the phone number provided in the operations above. The message may include a deep link which may cause an alert to be displayed on a screen of the mobile device 104. The alert may be selectable to cause the voice interface device application 132 to initiate and display the message. The message may include an indication that a guest session has been initiated and may request user input to further authenticate that the user desires to associate his or her account data with the host user's voice interface devices 102. For example, the user may provide touch input to a portion of the screen displaying a user interface that includes a selectable portion to confirm that the guest user's account data should be associated with the host user's voice interface devices 102. Data indicating this confirmation may be sent to the guest component 148, which may determine that two-factor authentication, here voice authentication and confirmation from the voice interface device application 132, is successful. The guest component 148 may update the guest session to indicate that the two-factor authentication is successful. In other examples, an error may occur during the authentication process utilizing the voice interface device application 132. For example, the application 132 may be utilized by more than one account holder and in some instances an account other than the one associated with the guest user may be logged in to at the time that the request for verification is received. This may lead to a person identification mismatch, which may cause the application 132 to render a user interface indicating the mismatch. The guest user may utilize this information to sign out of the other account and sign in to the guest user's account to provide the requested verification. In still other examples, no guest session may be found during this verification process. For example, when a request for verification is sent to the mobile device 104, the request may be associated with a predefined timeout limit for the verification to occur, such as 10 minutes. If the predefined timeout limit has expired, the guest session may expire and the mobile device 104 may render a user interface indicating that the guest session has expired.

The guest component 148 may then utilize the notification component 154 to send a notification one or more devices of the host user indicating that a guest user's account data has been associated with the host user's voice interface devices 102. This may allow the host user to initiate a disassociation process if the host user was not aware that a guest user was connected to his or her devices. The notification component 154 may also be utilized to send a notification to the mobile device 104 associated with the guest user. For example, the guest application component 150 may be called to determine the application 132 associated with the mobile device 104 and to cause the notification to be rendered utilizing user interfaces associated with the application 132. The guest component 148 may also update timeout information for dissociation of the guest user's account data from the voice interface device. The guest component 148 may also publish a guest session event to an event bus of the remote system 106, which may be utilized as described below to determine whether subsequent user utterances are associated with the guest user or the host user. At this point, the guest session may be active such that the guest user's account data is associated with the host user's voice interface devices 102.

Thereafter, users may provide user utterances to the voice interface devices 102 and the remote system 106 may be utilized to determine whether a given user utterance is from the guest user or the host user and perform operations based at least in part on that person identification. For example, one of the users may speak the phrase "play my playlist." Microphones 116 of the voice interface device 102 may capture that audio, generate corresponding audio data, and send the audio data to the remote system 106 for processing. For example, an orchestrator of the remote system 106 may receive data representing the request and may retrieve information about the context of the request. That information may include an indication that a guest session is established for the voice interface device 102 in question and that identification of the user is to be performed to determine a response to the request. The orchestrator may then query the speaker identification component 152 for person identifiers for the host user. The orchestrator may also query the guest component 148 for an identifier of the guest session, and may utilize that identifier of the guest session to query the speaker identification component 152 for person identifiers of the guest user. At this point, the orchestrator may have received the person identifiers for the host user and the guest user, and the orchestrator may build a speaker candidate set indicating the potential speakers of the user utterance.

The orchestrator may then connect to the ASR component 140 and initiate a request for speaker recognition, which may include providing the candidate set to the ASR component 140. The ASR component 140 may utilize the voice profiles of the candidate speakers to determine which voice profile of the candidate speakers corresponds to characteristics of the user utterance. If the ASR component 140 returns a result that the guest user is the most likely person to have provided the user utterance, then a context associated with the user utterance may be updated to indicate that the user utterance is from the guest user. For example, the NLU component 142 may receive context data indicating that the speaker is the guest user and/or that when an intent is determined by the NLU component 142, the intent may be associated with resources available to the guest user's account. This data may also be sent to one or more skills and/or domain speechlets 156 associated with the guest user's account. The skills and/or domain speechlets 156 may utilize this information to process requests from the NLU component 142 and return results. In examples, updating the context to indicate that the request is associated with the guest user may be performed prior to and/or in parallel with the ASR component 140 determining whether the request is from the guest user or the host user. This may decrease latency in providing a response to the user. However, in these examples, where the ASR component 140 determines that the request is from the host user instead of the guest user, the orchestrator may cause the context associated with the request to be updated to reflect that the speaker is the host user.

Returning to the instances where the speaker is determined to be the guest user, the NLU component 142 may determine an intent associated with the user utterance. Using the example above, for the user utterance of "play my playlist," the NLU component 142 may identify a "play music" intent and may identify the music to be played as "my playlist." The NLU component 142 may utilize the data indicating that the guest user provided the request to determine which music corresponds to the guest user's playlist. For example, the guest user's identification data may be utilized by an entity recognition component to determine which playlist associated with the guest user is being requested for output on the voice interface device 102. The NLU component 142 may also utilize the guest user's identification data to determine which services are available to the guest user's account, such as which streaming music services are available to facilitate the request to play music. The NLU component 142 may determine one or more speechlets 156 to facilitate the request and may provide information associated with the request to the speechlets 156 for processing. The speechlets 156 may receive the information from the NLU component 142, may process the request, and may cause the voice interface device 102 to perform one or more actions associated with the request, such as outputting content associated with "my playlist."

The user registry component 138 may be configured to identify, determine, and/or generate associations between users, user accounts, and/or devices. For example, one or more associations between user accounts may be identified, determined, and/or generated by the user registry 138. The user registry 138 may additionally store information indicating one or more applications and/or resources accessible to and/or enabled for a given user account. Additionally, the user registry 138 may include information indicating device identifiers, such as naming identifiers, associated with a given user account, as well as device types associated with the device identifiers. The user registry 138 may also include information indicating user account identifiers, naming indicators of devices associated with user accounts, and/or associations between devices, such as the voice interface device 102. The user registry 138 may also include information associated with usage of the smart devices and/or the voice interface devices. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

As shown in FIG. 1, several of the components of the remote system 106 and the associated functionality of those components as described herein may be performed by the voice interface device 102 and/or the mobile device 104. Additionally, or alternatively, some or all of the components and/or functionalities associated with the voice interface device 102 and/or the mobile device 104 may be performed by the remote system 106.

It should be noted that the exchange of data and/or information as described herein, and/or the performance of operations as described herein, may be performed only in situations where a user has provided consent for the exchange of such information and/or performance of such operations. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 120 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 120, and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110, 120, and/or the processor(s) described with respect to the components of the remote system 106 may possess its own local memory, which also may store program components, program data, and/or one or more operating systems.

The memory 114, 124, and/or the memory described with respect to the components of the remote system 106 may include volatile and nonvolatile memory, removable and non-removable media implemented in any method or technology for storage of information, such as computer-readable instructions, data structures, program component, or other data. Such memory 114, 124, and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 124, and/or the memory described with respect to the components of the remote system 106 may be implemented as computer-readable storage media ("CRSM"), which may be any available physical media accessible by the processor(s) 110, 120, and/or the processor(s) described with respect to the remote system 106 to execute instructions stored on the memory 114, 124, and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 124, and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 112, 122, and/or the network interface(s) described with respect to the components of the remote system 106 may enable messages between the components and/or devices shown in system 100 and/or with one or more other polling systems, as well as other networked devices. Such network interface(s) 112, 122, and/or the network interface(s) described with respect to the components of the remote system 106 may include one or more network interface controllers (NICs) or other types of transceiver devices to send and receive messages over the network 108.

For instance, each of the network interface(s) 112, 122, and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 122, and/or the network interface(s) described with respect to the components of the remote system 106 may include a wide area network (WAN) component to enable message over a wide area network.

In some instances, the remote system 106 may be local to an environment associated the voice interface devices 102. For instance, the remote system 106 may be located within one or more of the voice interface devices 102. In some instances, some or all of the functionality of the remote system 106 may be performed by one or more of the voice interface devices 102. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2A:
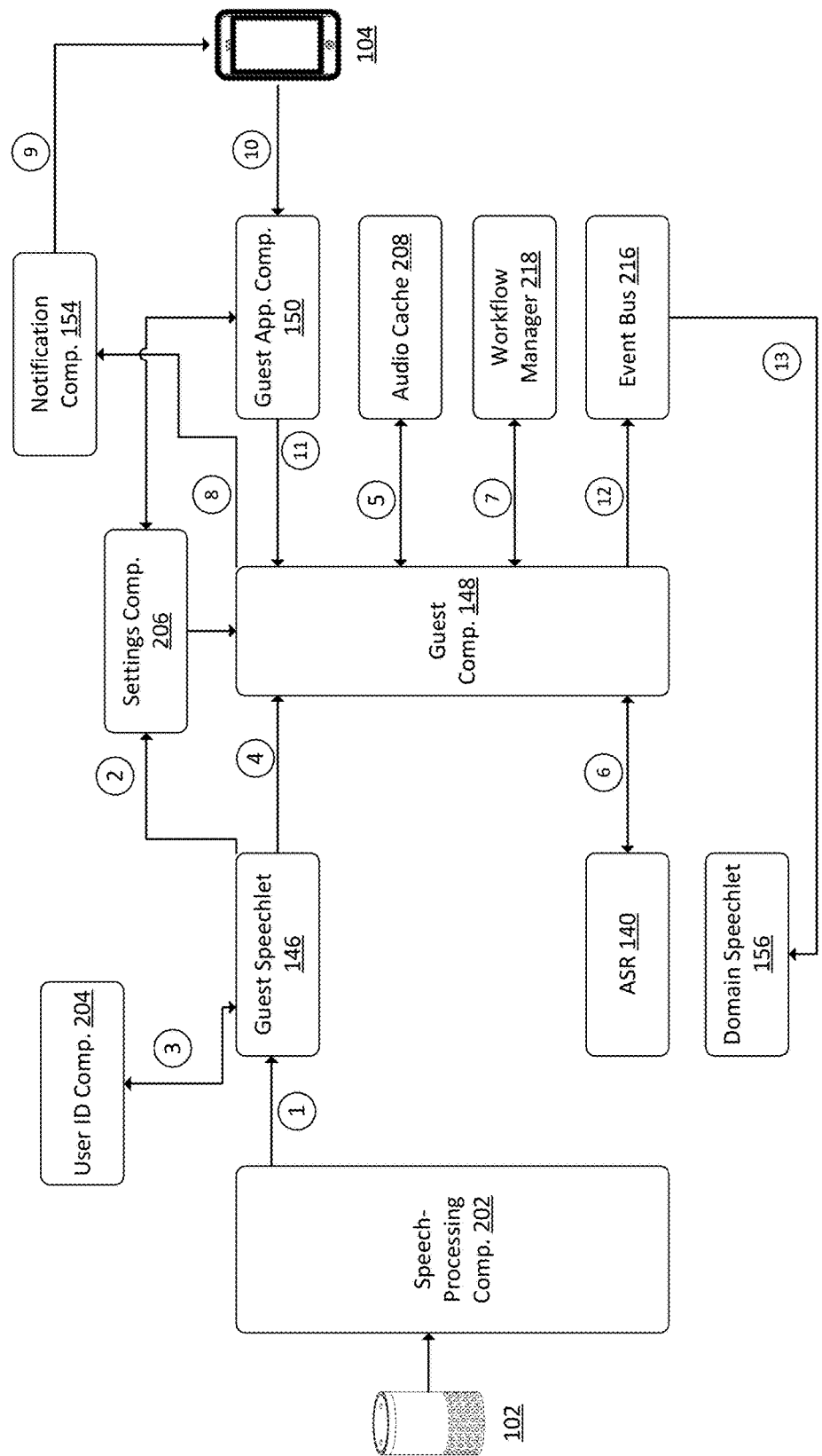
FIG. 2A illustrates a conceptual diagram of example components utilized for account association with devices.

FIG. 2A illustrates a conceptual diagram of example components utilized for account data association with devices. The components may include the same or similar components are described above with respect to FIG. 1, such as the guest speechlet 146, the guest component 148, the guest application component 150, the notification component 154, and/or the domain speechlet(s) 156. The components of the system depicted in FIG. 2A may also include a speech-processing component 202, a user identifier component 204, a settings component 206, an audio cache 208, an event bus 216, and/or a workflow manager 218. It should be understood that while the operations described with respect to FIG. 2A are described in a stepwise process from steps 1 to 13, the processes may be performed in a different order and/or in parallel and may include more or less than 13 steps.

At step 1, a guest user may provide a user utterance to one or more of the host user's voice interface devices 102 indicating an intent to associate the guest user's account data with the voice interface devices 102. For example, the user may speak the phrase "connect me here." Microphones of the voice interface device 102 may capture this audio, generate corresponding audio data, and send the audio data to a remote system, and specifically to the speech-processing interface 202. The remote system may determine that the user utterance includes the phrase "connect me here" or a similar phrase, and may utilize a guest speechlet 146 configured to handle performance of operations associated with such an utterance to initiate account data association.

For example, at step 2, the guest speechlet 146 may query the settings component 204 to determine if the voice interface device 102 is associated with account data that indicates guest access has been enabled utilizing the voice interface device 102. In this example, the host user has provided consent to enable guest access and, at step 3, the guest speechlet 146 may query the user identifier component 206 to determine a user identifier associated with the request to associate account data with the voice interface device 102. The user identifier component 206 provide an indication of whether guest access has been set up in association with the guest user's account.

At step 4, the guest speechlet 146 may instruct the guest component 148 to generate a guest session. The guest speechlet 146 may then be utilized to cause the voice interface devices 102 to output audio representing a request for identifying information of a mobile device 104 associated with the guest user. For example, the audio may include synthesized speech stating "what is your phone number?" The guest user may provide another user utterance that includes the requested identifying information, such as the phone number associated with the mobile device of the guest user. The microphones may capture that audio, generate corresponding audio data, and send the audio data to the remote system. The guest speechlet 146 may receive data indicating the identifying information and may query the user identifier component 206 for account data information associated with the guest user. The user identifier component 206 may utilize the provided phone number to determine the mobile device 104 identifier associated with the guest user and the guest user's account. The user identifier component 206 may provide this information, which may include the guest user's identification, the host user's identification, and/or settings information, to the guest speechlet 146, which may cause the guest component 148 to initiate the guest session.

At step 5, the guest component 148 may query the audio cache 208 for the audio data representing one or more of the user utterances provided by the guest user, such as the audio data representing the phone number requested in the operations above. At step 6, the ASR component 140 may perform an analysis of the audio data corresponding to the guest user's voice to determine if a voice profile associated with the audio data corresponds to the reference voice profile of the guest user that was generated as part of the guest setup process. The ASR component 140 may compare the characteristics of the audio data with the characteristics of the reference voice profile to determine whether the characteristics correspond to each other, such as to a threshold degree of confidence. In examples where the characteristics correspond, the ASR component 140 may return data to the guest component 148 indicating that voice authentication of the guest user was successful and account data association may continue. It should be understood that while authentication of the guest user as described above includes the use of voice recognition techniques, additional and/or different techniques may also be utilized, such as facial recognition techniques in instances where the voice interface device and/or another associated device includes a camera and the guest user has consented to the capture of images of the guest user for authentication purposes.

The guest component 148 may update the guest session to indicate that voice authentication of the guest user is successful and may, at step 7, utilize the workflow manager 218 to set up a disconnection routine for the guest session. For example, the disconnection routine may include indicating options for when the guest user's account data will be disassociated with the host user's voice interface devices. These options may include, for example, when the remote system devices that a user utterance is received indicating an intent by the guest user and/or the host user to disassociate the guest user's account data from the host user's voice interface devices, when the remote system receive input data, such as via the voice interface device application, from the mobile device of the guest user and/or the host user indicating a request to disassociate the account data, when another guest session is initiated using the voice interface devices, and/or after the expiration of a predefined amount of time, such as 24 hours for example.

At step 8, the guest component 148 may be utilized query a notification component 154 to generate one or more notifications for sending to the guest user and/or the host user. For example, the notification component 148, at step 9, may identify and/or generate a message and may send the message to the mobile device, such as by utilizing the phone number provided in the operations above. The message may include a deep link which may cause an alert to be displayed on a screen of the mobile device. The alert may be selectable to cause the voice interface device application to initiate and display the message. The message may include an indication that a guest session has been initiated and may request user input to further authenticate that the user desires to associate his or her account data with the host user's voice interface devices. For example, at step 10, the user may provide touch input to a portion of the screen displaying a user interface that includes a selectable portion to confirm that the guest user's account data should be associated with the host user's voice interface devices. At step 11, data indicating this confirmation may be sent to the guest component 148, which may determine that two-factor authentication, here voice authentication and confirmation from the voice interface device application, is successful. The guest component 148 may update the guest session to indicate that the two-factor authentication is successful. In other examples, an error may occur during the authentication process utilizing the voice interface device application. For example, the application may be utilized by more than one account holder and in some instances an account other than the one associated with the guest user may be logged in to at the time that the request for verification is received. This may lead to a person identification mismatch, which may cause the application to render a user interface indicating the mismatch. The guest user may utilize this information to sign out of the other account and sign in to the guest user's account to provide the requested verification. In still other examples, no guest session may be found during this verification process. For example, when a request for verification is sent to the mobile device, the request may be associated with a predefined timeout limit for the verification to occur, such as 10 minutes. If the predefined timeout limit has expired, the guest session may expire, and the mobile device may render a user interface indicating that the guest session has expired.

The guest component 148 may then utilize the notification component 154 to send a notification one or more devices of the host user indicating that a guest user's account data has been associated with the host user's voice interface devices. This may allow the host user to initiate a disassociation process if the host user was not aware that a guest user was connected to his or her devices. The communication component may also be utilized to send a notification to the mobile device associated with the guest user. The guest component may also update timeout information for dissociation of the guest user's account data from the voice interface device. At step 12, the guest component 148 may also publish a guest session event to the event bus 216, which may be utilized as described below to determine whether subsequent user utterances are associated with the guest user or the host user. At this point, the guest session may be active such that the guest user's account data is associated with the host user's voice interface devices. At step 13, the event bus 216 may communicate with the domain speechlet 156 to inform the domain speechlet 156 that the guest session has started and domains and intents associated with subsequent user utterances may be associated with the guest user's account data.

Figure 2B:
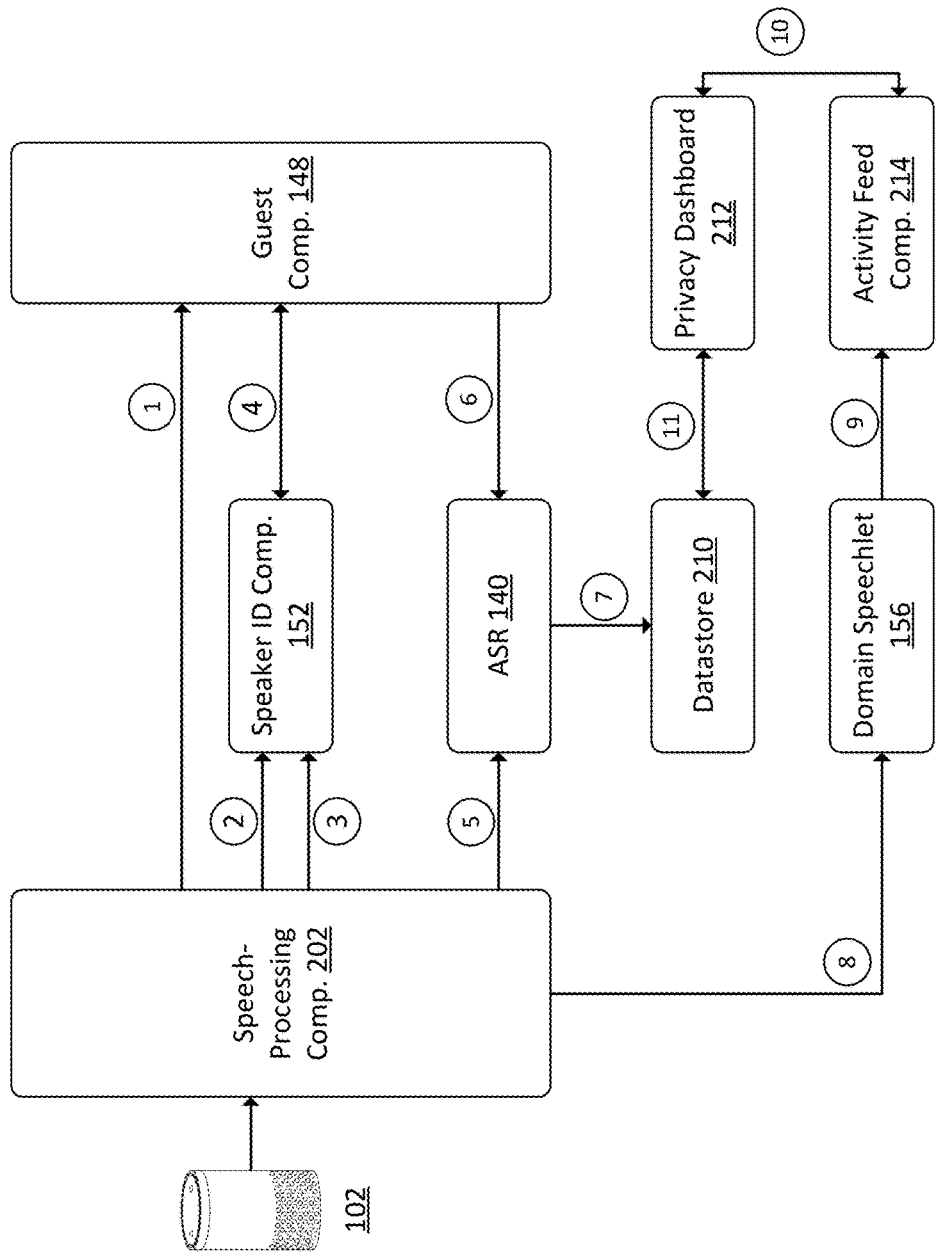
FIG. 2B illustrates a conceptual diagram of example components utilized for determining whether a user utterance is associated with a guest account or a host account.

FIG. 2B illustrates a conceptual diagram of example components utilized determining when a user utterance should be associated with a guest account or a host account. The components may include the same or similar components are described above with respect to FIG. 1 and FIG. 2A, such as the guest component 148, the speaker identification component 152, the domain speechlet(s) 156, the speech-processing component 202, and/or the ASR component 140. The components of the system depicted in FIG. 2B may also include a datastore 210, a privacy dashboard 212, and/or an activity-feed component 214. It should be understood that while the operations described with respect to FIG. 2B are described in a stepwise process from steps 1 to 11, the processes may be performed in a different order and/or in parallel and may include more or less than 11 steps.

Once a guest account is associated with host devices as described with respect to FIG. 2A, for example, users may provide user utterances to the voice interface devices and the remote system may be utilized to determine whether a given user utterance is from the guest user or the host user and perform operations based at least in part on that person identification. For example, one of the users may speak the phrase "play my playlist." Microphones of the voice interface device may capture that audio, generate corresponding audio data, and send the audio data to the remote system for processing. For example, an orchestrator of the remote system may receive data representing the request and may retrieve information about the context of the request. That information may be utilized, at step 1, to determine that a guest session is established for the voice interface device in question and that identification of the user is to be performed to determine a response to the request. The orchestrator may then, at step 2, query the speaker identification component 152 for person identifiers for the host user, and at step 3 may query the speaker identification component 152 for device identifiers associated with the host account.

At step 4, the guest component 148 may query the speaker identification component for the person identifier associated with the guest user. The voice profiles associated with the host account and the voice profiles associated with the guest account may be provided to the guest component 148. At this point, the orchestrator may have received the person identifiers for the host user and the guest user, and the orchestrator may build a speaker candidate set indicating the potential speakers of the user utterance.

The audio data representing the user utterance may be sent, at step 5, to the ASR component 140. At step 6, the speaker candidate set may then be sent from the guest component 148 to the ASR component 140. The ASR component 140 may utilize the voice profiles of the candidate speakers to determine which voice profile of the candidate speakers corresponds to characteristics of the user utterance. If the ASR component returns a result that the guest user is the most likely person to have provided the user utterance, then a context associated with the user utterance may be updated to indicate that the user utterance is from the guest user. At step 7, this information may be sent to a datastore to be utilized by one or more components of the system. For example, a natural language understanding component (NLU) may receive context data indicating that the speaker is the guest user and/or that when an intent is determined by the NLU component, the intent may be associated with resources available to the guest user's account. This data may also be sent to one or more skills associated with the guest user's account. The skills may utilize this information to process requests from the NLU component and return results. In examples, updating the context to indicate that the request is associated with the guest user may be performed prior to and/or in parallel with the ASR component determining whether the request is from the guest user or the host user. This may decrease latency in providing a response to the user. However, in these examples, where the ASR component determines that the request is from the host user instead of the guest user, the orchestrator may cause the context associated with the request to be updated to reflect that the speaker is the host user.

Returning to the instances where the speaker is determined to be the guest user, the NLU component may determine an intent associated with the user utterance. Using the example above, for the user utterance of "play my playlist," the NLU component may identify a "play music" intent and may identify the music to be played as "my playlist." The NLU component may utilize the data indication that the guest user provided the request to determine which music corresponds to the guest user's playlist. For example, the guest user's identification data may be utilized by an entity recognition component to determine which playlist associated with the guest user is being requested for output on the voice interface device. The NLU component may also utilize the guest user's identification data to determine which services are available to the guest user's account, such as which streaming music services are available to facilitate the request to play music. At step 8, the NLU component may determine one or more speechlets 156 to facilitate the request and may provide information associated with the request to the speechlets 156 for processing. The speechlets may receive the information from the NLU component, may process the request, and may cause the voice interface device to perform one or more actions associated with the request, such as outputting content associated with "my playlist."

At step 9, the domain speechlet 156 may publish activity data indicating operations taken in association with the account data utilizing the speechlet 156. This information may be made available in an activity feed associated with the voice interface devices. At step 10, a privacy dashboard 212 may be utilized to separate activity feed data associated with the guest user's account data and activity feed data associated with the host user's account data. At step 11, the privacy dashboard 212 may query the datastore for information indicating which account was utilized in connection with a given operation by the speechlet 156 to differentiate between actions associated with the guest user profile and actions associated with the host user profile.

FIG. 3A illustrates an example user interface 305 for set up of account data association with devices by host users. The user interface 305 may be the same as or similar to the user interfaces described with respect to FIG. 1. FIG. 3A depicts changes to the user interface from left to right. The user interface 305 may be utilized to allow a host user to enable guest access on voice interface devices associated with the host user.

For example, the user interface 305 may include a settings menu 302, which may include one or more settings associated with voice interface devices, smart devices, user accounts, and/or speech processing associated with user utterances received by the voice interface devices. The settings menu 302 may include a guest option 304, which may be selectable to allow the user to provide input associated with enabling or disabling guest functionality as described herein. The functionality may also include adjusting preferences associated with guest access, such as controlling which user identifiers are enabled for guest access, the default timeout period for guest sessions, which devices are enabled for guest access, restrictions on operations performed by the voice interface devices during a guest session, etc. Selection of the guest option 304 may cause the user interface 305 to display a request 306 for the user to indicate whether guest access should be enabled or not. For example, the request 306 may include asking whether to allow guests to ask for personal content from their account and providing a selectable portion for the user to provide input on whether to allow guest access.

FIG. 3A illustrates an example user interface 305 for set up of account data association with devices by host users. The user interface 305 may be the same as or similar to the user interfaces described with respect to FIG. 1. FIG. 3A depicts changes to the user interface from left to right. The user interface 305 may be utilized to allow a host user to enable guest access on voice interface devices associated with the host user.

For example, the user interface 305 may include a settings menu 302, which may include one or more settings associated with voice interface devices, smart devices, user accounts, and/or speech processing associated with user utterances received by the voice interface devices. The settings menu 302 may include a guest option 304, which may be selectable to allow the user to provide input associated with enabling or disenabling guest functionality as described herein. The functionality may also include adjusting preferences associated with guest access, such as controlling which user identifiers are enabled for guest access, the default timeout period for guest sessions, which devices are enabled for guest access, restrictions on operations performed by the voice interface devices during a guest session, etc. Selection of the guest option 304 may cause the user interface 305 to display a request 306 for the user to indicate whether guest access should be enabled or not. For example, the request 306 may include asking whether to allow guests to ask for personal content from their account and providing a selectable portion for the user to provide input on whether to allow guest access.

FIG. 3B illustrates an example user interface 310 for set up of account data association with devices by the guest users. The user interface 310 may be the same as or similar to the user interfaces described with respect to FIG. 1. The user interface 310 may be utilized to allow a guest user to enable guest access on voice interface devices associated with other host users.

For example, the user interface 310 may include a guest setup menu 308, which may include information on how to set up guest functionality as described herein. For example, the guest setup menu 308 may include a device identifier option 310 for adding a device identifier to be utilized for gust access. The device identifier, for example, may be a phone number associated with a mobile device of the guest user. The guest setup menu 408 may also include a voice training option 312 for initiating a training session for acquiring and/or generating a voice profile for use for initiating a guest session and/or during a guest session. Upon selection of the voice training option 312, the user interface 310 may display a request for the user to provide one or more user utterances, which may be captured, and the corresponding audio data may be utilized to generate the voice profiles.

Figure 4:
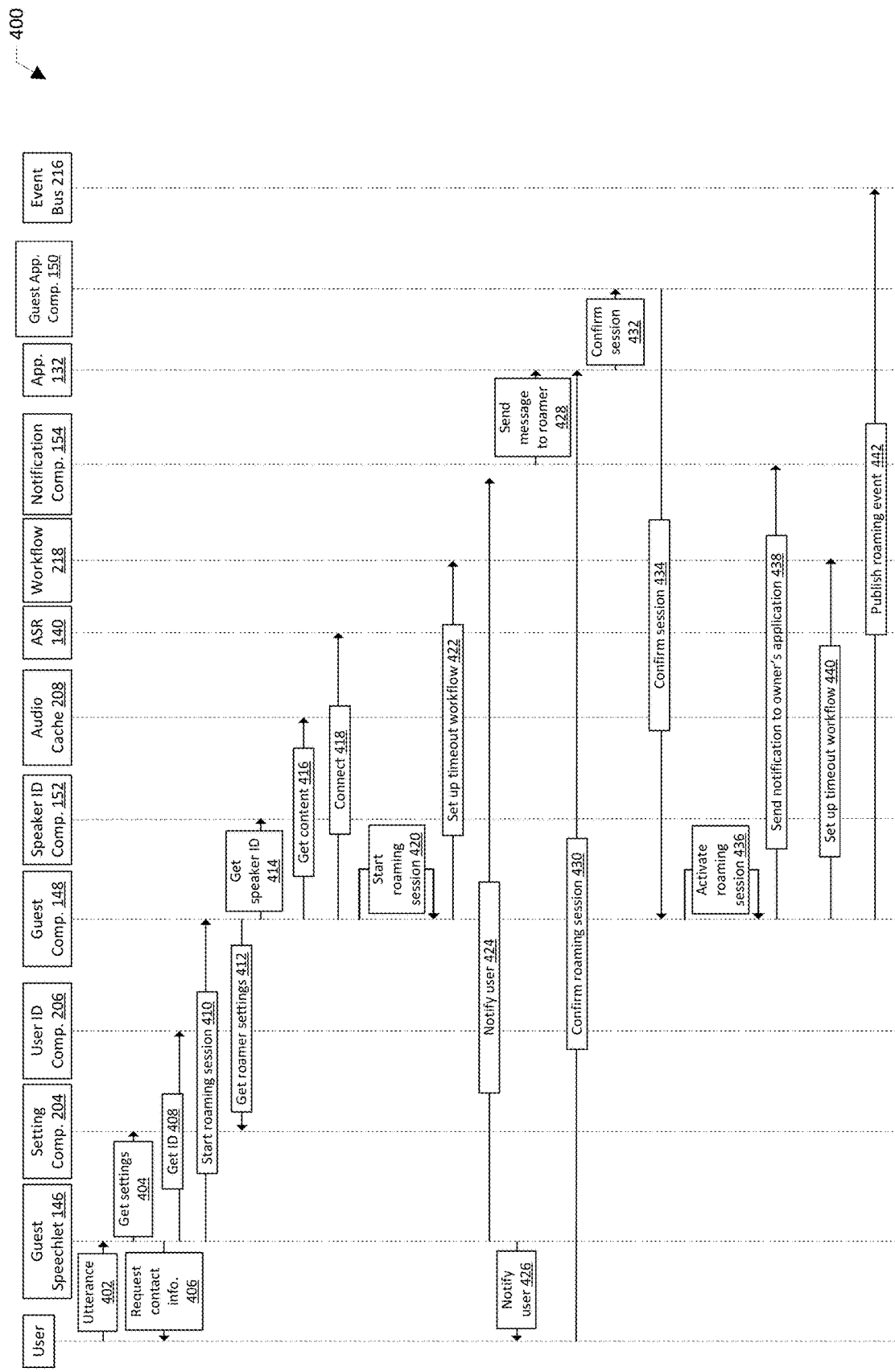
FIG. 4 illustrates a sequence diagram of an example flow of interactions arranged in a time sequence for connecting a device with account data.

FIG. 4 illustrates a sequence diagram 400 of an example flow of interactions arranged in a time sequence for connecting a device with account data. It should be understood that while the sequence diagram 400 is described in a stepwise manner, some or all of the operations described with respect to FIG. 4 may be performed in a different order and/or in parallel.

At block 402, a guest user may provide a user utterance to one or more of the host user's voice interface devices indicating an intent to associate the guest user's account data with the voice interface devices. For example, the user may speak the phrase "connect me here." Microphones of the voice interface device may capture this audio, generate corresponding audio data, and send the audio data to a remote system, and specifically to the guest speechlet 146. The remote system may determine that the user utterance includes the phrase "connect me here" or a similar phrase, and may utilize the guest speechlet 146 configured to handle performance of operations associated with such an utterance to initiate account data association.

At block 404, the guest speechlet 146 may query the settings component 204 to determine if the voice interface device is associated with account data that indicates guest access has been enabled utilizing the voice interface device. In this example, the host user has provided consent to enable guest access.

At block 406, the guest speechlet 146 may then be utilized to cause the voice interface devices to output audio representing a request for identifying information of a mobile device associated with the guest user. For example, the audio may include synthesized speech stating "what is your phone number?" The guest user may provide another user utterance that includes the requested identifying information, such as the phone number associated with the mobile device of the guest user. The microphones may capture that audio, generate corresponding audio data, and send the audio data to the remote system.

The guest speechlet 146 may receive data indicating the identifying information and may, at block 408, query a user identifier component 206 for account data information associated with the guest user. The user identifier component 206 may utilize the provided phone number to determine the mobile device identifier associated with the guest user and the guest user's account.

At block 410, the user identifier component 206 may provide this information, which may include the guest user's identification, the host user's identification, and/or settings information, to the guest speechlet 146, which may cause the guest component 148 to initiate the guest session.

At block 412, the guest component 148 may return the guest settings associated with the mobile device and determine that the guest session may be initiated. At block 414, the guest component 148 may query the speaker identification component 152 for speaker identifiers associated with the guest user. The speaker identification component 152 may also be queried for the voice profile(s) associated with the guest user. At block 416, the guest component 148 may query the audio cache 208 for the audio data representing one or more of the user utterances provided by the guest user, such as the audio data representing the phone number requested in the operations above.

At block 418, the guest component 148 may connect with the ASR component 140 to perform an analysis of the audio data corresponding to the guest user's voice to determine if a voice profile associated with the audio data corresponds to the reference voice profile of the guest user that was generated as part of the guest setup process. The ASR component 140 may compare the characteristics of the audio data with the characteristics of the reference voice profile to determine whether the characteristics correspond to each other, such as to a threshold degree of confidence. In examples where the characteristics correspond, the ASR component 140 may return data to the guest component 148 indicating that voice authentication of the guest user was successful and account data association may continue. It should be understood that while authentication of the guest user as described above includes the use of voice recognition techniques, additional and/or different techniques may also be utilized, such as facial recognition techniques in instances where the voice interface device and/or another associated device includes a camera and the guest user has consented to the capture of images of the guest user for authentication purposes.

At block 420, the guest component 148 may update the guest session to indicate that voice authentication of the guest user is successful and may, at block 422, utilize a workflow component 218 to set up a disconnection routine for the guest session. For example, the disconnection routine may include indicating options for when the guest user's account data will be disassociated with the host user's voice interface devices. These options may include, for example, when the remote system devices that a user utterance is received indicating an intent by the guest user and/or the host user to disassociate the guest user's account data from the host user's voice interface devices, when the remote system receive input data, such as via the voice interface device application, from the mobile device of the guest user and/or the host user indicating a request to disassociate the account data, when another guest session is initiated using the voice interface devices, and/or after the expiration of a predefined amount of time, such as 24 hours for example.

At block 424, the guest speechlet 146 may be utilized query a notification component 154 to generate one or more notifications for sending to the guest user and/or the host user. At block 426, the user may be notified that the guest session is being enabled. At block 428, the notification component 154 may identify and/or generate a message. The message may include a deep link which may cause an alert to be displayed on a screen of the mobile device. The alert may be selectable to cause the voice interface device application to initiate and display the message. The message may include an indication that a guest session has been initiated and may request user input to further authenticate that the user desires to associate his or her account data with the host user's voice interface devices. At block 428, the notification component 154 may send the message to the application 132 residing on the mobile device, such as by utilizing the phone number provided in the operations above. At block 430, the user may provide touch input to a portion of the screen displaying a user interface that includes a selectable portion to confirm that the guest user's account data should be associated with the host user's voice interface devices. Data indicating this confirmation may be sent, at block 432, to the guest application component 152, which may determine that two-factor authentication, here voice authentication and confirmation from the voice interface device application, is successful.

At block 434, the guest application component 150 may send an indication to the guest component 148 that the guest session authentication has been confirmed, and at block 436, the guest component 148 may activate the guest session.

At block 438, the guest component 148 may then utilize notification component 154 to send a notification one or more devices of the host user indicating that a guest user's account data has been associated with the host user's voice interface devices. This may allow the host user to initiate a disassociation process if the host user was not aware that a guest user was connected to his or her devices. The notification component may also be utilized to send a notification to the mobile device associated with the guest user. The guest component may also update timeout information for dissociation of the guest user's account data from the voice interface device.

At block 440, the guest component 148 may communicate with the workflow manager 218 to update dissociation events that may dissociate the guest user's account data from the host user's voice interface devices. At block 442, the guest component 148 may also publish a guest session event to the event bus 216, which may be utilized as described below to determine whether subsequent user utterances are associated with the guest user or the host user. At this point, the guest session may be active such that the guest user's account data is associated with the host user's voice interface devices.

Figure 5:
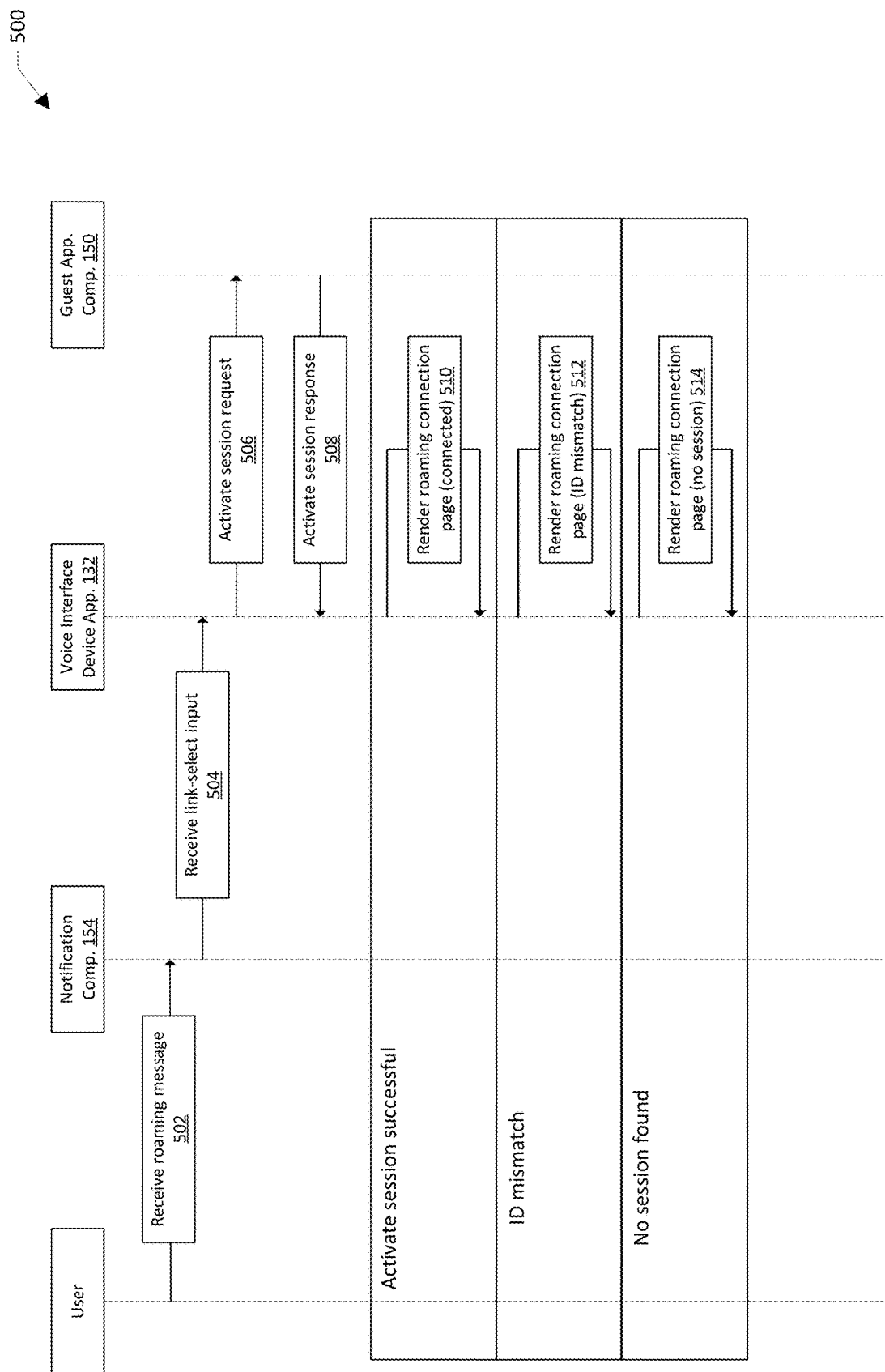
FIG. 5 illustrates a sequence diagram of an example flow of interactions arranged in a time sequence for guest session authentication.

FIG. 5 illustrates a sequence diagram 500 of an example flow of interactions arranged in a time sequence for guest session authentication. It should be understood that while the sequence diagram 500 is described in a stepwise manner, some or all of the operations described with respect to FIG. 5 may be performed in a different order and/or in parallel.

At block 502, an indication to initiate a guest session may be received from a user. For example, the user may speak the phrase "connect me here." Microphones of a voice interface device may capture this audio, generate corresponding audio data, and send the audio data to a remote system. The remote system may determine that the user utterance includes the phrase "connect me here" or a similar phrase, and may utilize a guest speechlet configured to handle performance of operations associated with such an utterance to initiate account data association.

At block 504, in addition to voice recognition authentication as described more fully above, authentication of the guest user to initiate the guest session may be performed. The notification component 154 may identify and/or generate a message. The message may include a deep link which may cause an alert to be displayed on a screen of the mobile device. The alert may be selectable to cause the voice interface device application to initiate and display the message. The message may include an indication that a guest session has been initiated and may request user input to further authenticate that the user desires to associate his or her account data with the host user's voice interface devices. The notification component 154 may send the message to the application 132 residing on the mobile device, such as by utilizing the phone number provided in the operations above. The user may provide touch input to a portion of the screen displaying a user interface that includes a selectable portion to confirm that the guest user's account data should be associated with the host user's voice interface devices. Data indicating this confirmation may be sent, at block 506, to the guest application component 150, along with a request to activate the guest session. At block 508, the guest application component 150 may return a response indicating that the guest session has been activated.

At block 510, if the guest session was successfully activated, the application 132 may render a connection page on the mobile device of the user indicating that the guest session was successfully activated. Alternatively, at block 512, an error may occur during the authentication process utilizing the voice interface device application. For example, the application may be utilized by more than one account holder and in some instances an account other than the one associated with the guest user may be logged in to at the time that the request for verification is received. This may lead to a person identification mismatch, which may cause the application 132 to render a user interface indicating the mismatch. The guest user may utilize this information to sign out of the other account and sign in to the guest user's account to provide the requested verification. In still other examples, at block 514, no guest session may be found during this verification process. For example, when a request for verification is sent to the mobile device, the request may be associated with a predefined timeout limit for the verification to occur, such as 10 minutes. If the predefined timeout limit has expired, the guest session may expire and the application 132 may render a user interface indicating that the guest session has expired.

Figure 6:
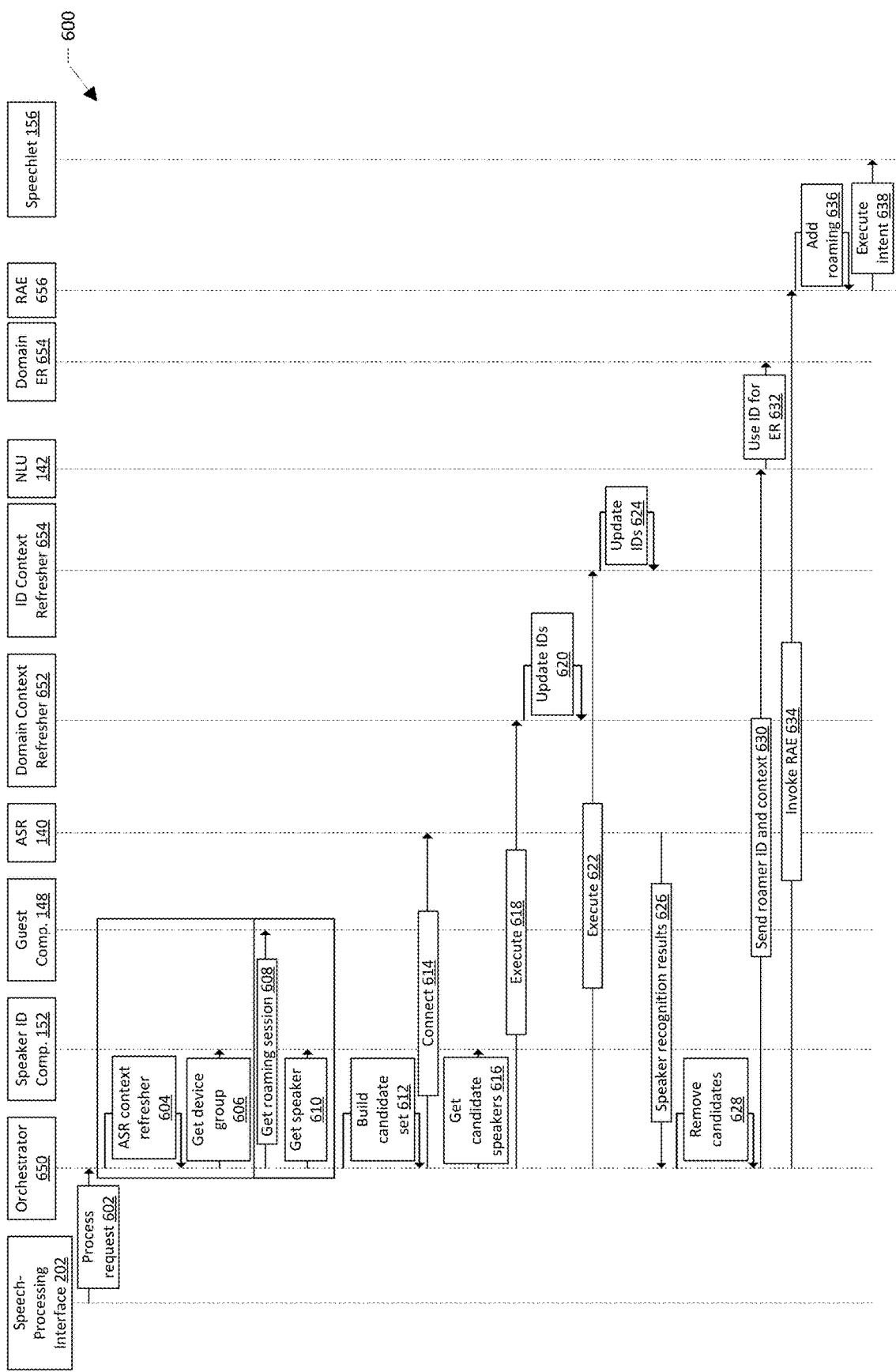
FIG. 6 illustrates a sequence diagram of an example flow of interactions arranged in a time sequence for guest session utilization.

FIG. 6 illustrates a sequence diagram 600 of an example flow of interactions arranged in a time sequence for guest session utilization. It should be understood that while the sequence diagram 600 is described in a stepwise manner, some or all of the operations described with respect to FIG. 6 may be performed in a different order and/or in parallel.

At block 602, one of several potential users may provide a user utterance to a voice interface device where a guest session is active. For example, the user may speak the phrase "play my playlist." Microphones of the voice interface device may capture that audio, generate corresponding audio data, and send the audio data to the remote system for processing. For example, an orchestrator 650 of the remote system may receive data representing the request as processed by a speech-processing interface 202.

At block 604, the orchestrator may call a speaker identification component to retrieve information about the context of the request. That information may be utilized, at block 608, to determine that a guest session is established for the voice interface device in question and that identification of the user is to be performed to determine a response to the request. The orchestrator 650 may query, at block 606, the speaker identification component 152 for person identifiers associated with the host user. At block 608, the orchestrator 650 may query the guest component 148 for the guest session associated with a given device. The orchestrator 650 may also query, at block 610, the speaker identification component 152 for person identifiers for the guest user. The orchestrator 650 may also query the guest component 148 for an identifier of the guest session, and may utilize that identifier of the guest session to query the speaker identification component for person identifiers of the guest user. At this point, the orchestrator 650 may have received the person identifiers for the host user and the guest user, and the orchestrator 650, at block 612, may build a speaker candidate set indicating the potential speakers of the user utterance.

At block 614, the orchestrator 650 may then connect to the ASR component 140 and initiate a request for speaker recognition, which may include providing the candidate set to the ASR component 140. The ASR component 140 may utilize the voice profiles of the candidate speakers to determine which voice profile of the candidate speakers corresponds to characteristics of the user utterance. If the ASR component returns a result that the guest user is the most likely person to have provided the user utterance, then at block 616 the orchestrator 650 may query the speaker identification component 152 for the speaker candidates.

At block 618, the orchestrator 650 may execute a context refresher flow with the domain context refresher 652. At block 620, the domain context refresher 652 may utilize the identifier of the speaker to update a context associated with the user utterance, which may indicate that the user utterance is from the guest user. This information may be sent to a datastore to be utilized by one or more components of the system. At block 622, the orchestrator 650 may execute an identification refresher flow with the identification context refresher 654. At block 624, the identification context refresher 654 may utilize the identifier of the speaker to update an identifier of the user associated with the user utterance. This information may be sent to a datastore to be utilized by one or more components of the system.

In examples, updating the context to indicate that the request is associated with the guest user may be performed prior to and/or in parallel with the ASR component 140 determining whether the request is from the guest user or the host user. This may decrease latency in providing a response to the user. At block 626, for example, the ASR component 140 may return results of the voice recognition processes, indicating that the user utterance was determined to be from the guest user or the host user. If the user utterance is from the host user, then at block 628, the orchestrator 650 may remove the guest candidates and related information from the datastore or otherwise not provide information or context associated with the guest user to other components of the system. In examples where the ASR component 140 determines the user utterance is from the guest user, then at block 630 the orchestrator 650 may send the guest user identification and the context to the NLU component 142, which may receive the context data indicating that the speaker is the guest user and/or that when an intent is determined by the NLU component 142, the intent may be associated with resources available to the guest user's account.

At block 632, the NLU component 142 may send the guest user identifier and/or related information to a domain entity-recognition component 654, to be utilized for entity recognition during speech processing. At block 634, the orchestrator 650 may invoke a remote application engine 656, which may be utilized send information associated with the guest user, the guest user's account, and/or the specific request made during a guest session to other components of the system. At block 636, the domain entity-recognition component 654 may add the guest data to the entity-recognition logic to be utilized for speech processing. At block 638, the intent associated with the user request may be executed, such as by the domain speechlet 156.

Using the example above, for the user utterance of "play my playlist," the NLU component 142 may identify a "play music" intent and may identify the music to be played as "my playlist." The NLU component 142 and/or the domain entity-recognition component 654 may utilize the data indicating that the guest user provided the request to determine which music corresponds to the guest user's playlist. For example, the guest user's identification data may be utilized by the entity recognition component 654 to determine which playlist associated with the guest user is being requested for output on the voice interface device. The NLU component 142 may also utilize the guest user's identification data to determine which services are available to the guest user's account, such as which streaming music services are available to facilitate the request to play music. The NLU component 142 may determine one or more speechlets 156 to facilitate the request and may provide information associated with the request to the speechlets 156 for processing. The speechlets may receive the information from the NLU component 142, may process the request, and may cause the voice interface device to perform one or more actions associated with the request, such as outputting content associated with "my playlist."

Figure 7:
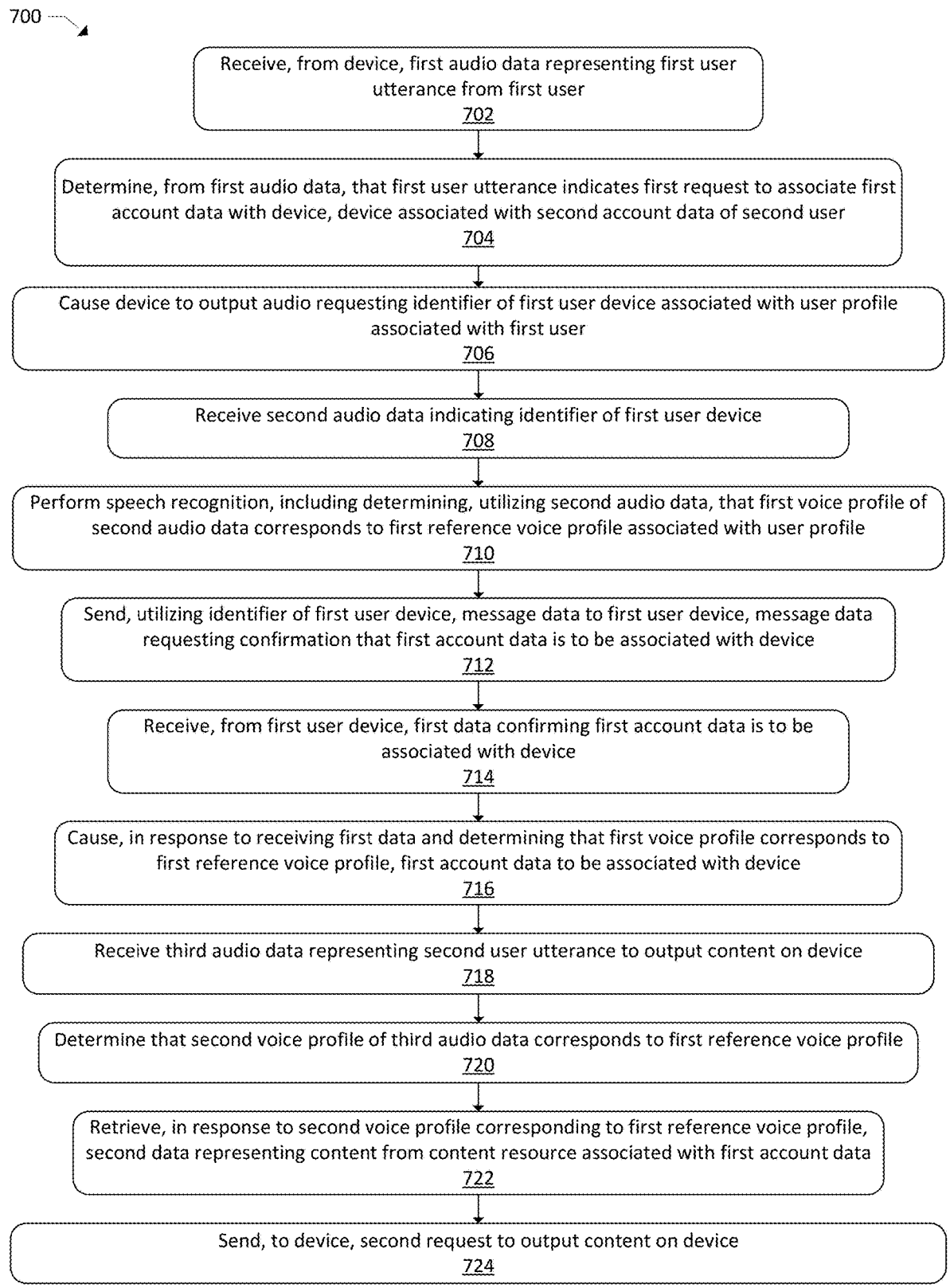
FIG. 7 illustrates a flow diagram of an example process for account association with devices.

FIGS. 7 and 8 illustrates processes for account data association with devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6, 9, and 10, although the processes may be implemented in a wide variety of other environments, architectures and systems.

FIG. 7 illustrates a flow diagram of an example process 700 for account data association with devices. The order in which the operations or steps are described is not intended to be construed as a limitation, and any number of the described operations may be combined in any order and/or in parallel to implement process 700.

At block 702, the process 700 may include receiving, from a voice interface device, first audio data representing a first user utterance from a first user. For example, the user may speak the phrase "connect me here." Microphones of the voice interface device may capture this audio, generate corresponding audio data, and send the audio data to a remote system.

At block 704, the process 700 may include determining, from the first audio data, that the first user utterance indicates a first request to associate first account data with the voice interface device, the voice interface device associated with second account data of a second user. For example, the remote system may determine that the user utterance includes the phrase "connect me here" or a similar phrase, and may utilize a guest speechlet configured to handle performance of operations associated with such an utterance to initiate account data association.

At block 706, the process 700 may include causing the voice interface device to output audio requesting an identifier of a user device associated with a first user profile associated with the first user. For example, the audio may include synthesized speech stating "what is your phone number?" The guest user may provide another user utterance that includes the requested identifying information, such as the phone number associated with the mobile device of the guest user. The microphones may capture that audio, generate corresponding audio data, and send the audio data to the remote system.

At block 708, the process 700 may include receiving second audio data indicating the identifier of the user device. For example, the remote system may receive the second audio data indicating the phone number associated with the mobile device of the first user profile.

At block 710, the process 700 may performing speech recognition, including determining, utilizing the second audio data, that a first voice profile of the second audio data corresponds to a reference voice profile associated with the first user profile. For example, a guest component of the remote system may connect with an ASR component to perform an analysis of the audio data corresponding to the guest user's voice to determine if a voice profile associated with the audio data corresponds to the reference voice profile of the guest user that was generated as part of the guest setup process. The ASR component may compare the characteristics of the audio data with the characteristics of the reference voice profile to determine whether the characteristics correspond to each other, such as to a threshold degree of confidence. In examples where the characteristics correspond, the ASR component may return data to the guest component indicating that voice authentication of the guest user was successful and account data association may continue. It should be understood that while authentication of the guest user as described above includes the use of voice recognition techniques, additional and/or different techniques may also be utilized, such as facial recognition techniques in instances where the voice interface device and/or another associated device includes a camera and the guest user has consented to the capture of images of the guest user for authentication purposes.

At block 712, the process 700 may include sending, utilizing the identifier of the user device, message data to the user device, the message data requesting confirmation that the first account data is to be associated with the voice interface device. For example, the message data may include a deep link which may cause an alert to be displayed on a screen of the user device. The alert may be selectable to cause the voice interface device application to initiate and display the message. The message may include an indication that a guest session has been initiated and may request user input to further authenticate that the user desires to associate his or her account data with the host user's voice interface devices. The notification component may send the message to the application residing on the mobile device, such as by utilizing the phone number provided in the operations above. The user may provide touch input to a portion of the screen displaying a user interface that includes a selectable portion to confirm that the guest user's account data should be associated with the host user's voice interface devices.

At block 714, the process 700 may include receiving, from the user device, first data confirming the first account data is to be associated with the voice interface device. For example, the first data indicating this confirmation may be sent to the guest application component, which may determine that two-factor authentication, here voice authentication and confirmation from the voice interface device application, is successful.

At block 716, the process 700 may include causing, in response to receiving the first data and determining that the first voice profile corresponds to the reference voice profile, the first account data to be associated with the voice interface device. For example, the remote system may store data indicating that when audio data representing user utterances are received from the device, the first account data or the second account data may be utilized to respond to the user utterances.

At block 718, the process 700 may include receiving third audio data representing a second user utterance to output content on the voice interface device. For example, the user may speak the phrase "play my playlist." Microphones of the voice interface device may capture that audio, generate corresponding audio data, and send the audio data to the remote system for processing. For example, an orchestrator of the remote system may receive data representing the request as processed by a speech-processing interface.

At block 720, the process 700 may include determining that a second voice profile of the third audio data corresponds to the reference voice profile. For example, the ASR component may utilize the voice profiles of the candidate speakers to determine which voice profile of the candidate speakers corresponds to characteristics of the user utterance. If the ASR component returns a result that the guest user is the most likely person to have provided the user utterance, then the orchestrator may query the speaker identification component for the speaker candidates, such as for natural language understanding processing.

At block 722, the process 700 may include retrieving, in response to the second voice profile corresponding to the reference voice profile, second data representing the content from a content resource associated with the first account data. For example, an NLU component may determine that the user utterance corresponds to a request to output content and may utilize the identifier of the user to determine which content resource associated with the guest's account data may be utilized to effectuate the intent. The NLU component may query the content resource, which may provide the content.

At block 724, the process 700 may include sending, to the voice interface device, a second request to output the content on the voice interface device. For example, the remote system may send the content as provided by the content resource to the voice interface device. The remote system may also generate a request that causes the voice interface device to output the content, such as via one or more speakers of the voice interface device.

Additionally, or alternatively, the process 700 may include identifying, from the first account data being associated with the voice interface device, the first reference voice profile. The process 700 may also include identifying, from receiving the third audio data from the voice interface device, a second reference voice profile associated with the second user. The process 700 may also include determining a first confidence value that the second voice profile corresponds to the first reference voice profile and determining a second confidence value that the second voice profile corresponds to the second reference voice profile. The process 700 may also include determining that the first confidence value indicates more confidence than the second confidence value. In these examples, determining that the second voice profile corresponds to the first reference voice profile may be in response to determining that the first confidence value indicates more confidence than the second confidence value.

Additionally, or alternatively, the process 700 may include determining devices other than the voice interface device associated with the second account data. The process 700 may also include causing the first account data to be associated with the devices based at least in part on the second device being associated with the second account data.

Additionally, or alternatively, the process 700 may include receiving, from the user device associated with the first account data, third data requesting enablement of account data association for the first account data. The process 700 may also include causing, in response to receiving the third data, the user device to display a third request for audio corresponding to one or more phrases. The process 700 may also include receiving fourth audio data representing the one or more phrases and generating the reference voice profile utilizing the fourth audio data.

Additionally, or alternatively, the process 700 may include generating third data indicating a dissociation event that, when indicated to have occurred, causes the first account data to be dissociated from the voice interface device, the dissociation event including at least one of: lapsing of a predefined duration of time; receiving, from the voice interface device, fourth audio data requesting dissociation; receiving, from at least one of the first user device or the second user device, first input data requesting dissociation; determining that a third request to associate third account data with the voice interface device has been received; or receiving second input data from the second user device indicating that consent for account data association with the voice interface device has been revoked. The process 700 may also include causing the first account data to be dissociated from the voice interface device in response to receiving the third data.

FIG. 8 illustrates a flow diagram of another example process 800 for account data association with devices. The order in which the operations or steps are described is not intended to be construed as a limitation, and any number of the described operations may be combined in any order and/or in parallel to implement process 800.

At block 802, the process 800 may include receiving request data to associate first account data with a first device associated with second account data, the first account data differing from the second account data. For example, the user may speak the phrase "connect me here." Microphones of the voice interface device may capture this audio, generate corresponding audio data, and send the audio data to a remote system. The remote system may determine, from the first audio data, that the first user utterance indicates a first request to associate first account data with the voice interface device, the voice interface device associated with second account data of a second user. For example, the remote system may determine that the user utterance includes the phrase "connect me here" or a similar phrase, and may utilize a guest speechlet configured to handle performance of operations associated with such an utterance to initiate account data association.

At block 804, the process 800 may include determining that a first voice profile corresponding to request data is associated with the first account data. For example, the voice interface device may output audio requesting an identifier of a user device associated with a first user profile of the first user. For example, the audio may include synthesized speech stating "what is your phone number?" The guest user may provide another user utterance that includes the requested identifying information, such as the phone number associated with the mobile device of the guest user. The microphones may capture that audio, generate corresponding audio data, and send the audio data to the remote system. The remote system may receive second audio data indicating the identifier of the user device. For example, the remote system may receive the second audio data indicating the phone number associated with the mobile device of the first user profile. The remote system may also determine, utilizing the second audio data, that a first voice profile of the second audio data corresponds to a reference voice profile associated with the first user profile. For example, a guest component of the remote system may connect with an ASR component to perform an analysis of the audio data corresponding to the guest user's voice to determine if a voice profile associated with the audio data corresponds to the reference voice profile of the guest user that was generated as part of the guest setup process. The ASR component may compare the characteristics of the audio data with the characteristics of the reference voice profile to determine whether the characteristics correspond to each other, such as to a threshold degree of confidence. In examples where the characteristics correspond, the ASR component may return data to the guest component indicating that voice authentication of the guest user was successful and account data association may continue. It should be understood that while authentication of the guest user as described above includes the use of voice recognition techniques, additional and/or different techniques may also be utilized, such as facial recognition techniques in instances where the voice interface device and/or another associated device includes a camera and the guest user has consented to the capture of images of the guest user for authentication purposes.

The remote system may send, utilizing the identifier of the user device, message data to the user device, the message data requesting confirmation that the first account data is to be associated with the voice interface device. For example, the message data may include a deep link which may cause an alert to be displayed on a screen of the mobile device. The alert may be selectable to cause the voice interface device application to initiate and display the message. The message may include an indication that a guest session has been initiated and may request user input to further authenticate that the user desires to associate his or her account data with the host user's voice interface devices. The notification component may send the message to the application residing on the mobile device, such as by utilizing the phone number provided in the operations above. The user may provide touch input to a portion of the screen displaying a user interface that includes a selectable portion to confirm that the guest user's account data should be associated with the host user's voice interface devices. The remote system may receive, from the user device, first data confirming the first account data is to be associated with the voice interface device. For example, the first data indicating this confirmation may be sent to the guest application component, which may determine that two-factor authentication, here voice authentication and confirmation from the voice interface device application, is successful.

At block 806, the process 800 may include causing, based at least in part on determining that the first voice profile is associated with the first account data, the first account data to be associated with the first device. For example, the remote system may store data indicating that when audio data representing user utterances are received from the device, the first account data or the second account data may be utilized to respond to the user utterances.

At block 808, the process 800 may include receiving, from the device, audio data representing a user utterance to perform an action. For example, the user may speak the phrase "play my playlist." Microphones of the voice interface device may capture that audio, generate corresponding audio data, and send the audio data to the remote system for processing. For example, an orchestrator of the remote system may receive data representing the request as processed by a speech-processing interface.

At block 810, the process 800 may include determining that a second voice profile associated with the first audio data corresponds to the first voice profile. For example, the ASR component may utilize the voice profiles of the candidate speakers to determine which voice profile of the candidate speakers corresponds to characteristics of the user utterance. If the ASR component returns a result that the guest user is the most likely person to have provided the user utterance, then the orchestrator may query the speaker identification component for the speaker candidates, such as for natural language understanding processing.

At block 812, the process 800 may include identifying an application associated with the first account data to perform the action. For example, an NLU component may determine that the user utterance corresponds to a request to output content and may utilize the identifier of the user to determine which content resource associated with the guest's account data may be utilized to effectuate the intent. The NLU component may query the content resource, which may provide the content.

At block 814, the process 800 may include causing the action to be performed utilizing the application. For example, the remote system may send the content as provided by the content resource to the voice interface device. The remote system may also generate a request that causes the voice interface device to output the content, such as via one or more speakers of the voice interface device.

Additionally, or alternatively, the process 800 may include identifying, from the first account data being associated with the voice interface device, a first reference voice profile and identifying, from receiving the audio data from the device, a second reference voice profile associated with the second account data. The process 800 may also include determining a first confidence value that the second voice profile corresponds to the first reference voice profile and determining a second confidence value that the second voice profile corresponds to the second reference voice profile. The process 800 may also include determining that the first confidence value indicates more confidence than the second confidence value. In these examples, determining that the second voice profile is associated with the first account data may be based at least in part on determining that the first confidence value indicates more confidence than the second confidence value.

Additionally, or alternatively, the process 800 may include receiving, from a user device associated with the first account data, first data requesting enablement of account data association for the first account data. The process 800 may also include causing, based at least in part on receiving the first data, the user device to display a second request for audio corresponding to one or more phrases. The process 800 may also include receiving second audio data representing the one or more phrases and generating a reference voice profile utilizing the second audio data. In these examples, determining that the first request is valid may be based at least in part on the voice profile corresponding to the reference voice profile.

Additionally, or alternatively, the process 800 may include generating first data indicating a dissociation event that, when indicated to have occurred, causes the first account data to be dissociated from the device, the dissociation event including at least one of: lapsing of a predefined duration of time; receiving, from the device, second audio data requesting dissociation; receiving, from at least one of the first user device or the second user device, first input data requesting dissociation; determining that a second request to associate third account data with the device has been received; or receiving second input data from the second user device indicating that consent for account data association with the device has been revoked. The process 800 may also include causing the first account data to be dissociated from the device in response to receiving the first data.

Additionally, or alternatively, the process 800 may include generating, based at least in part on causing the first account data to be associated with the device, first data including a notification that the first account data has been associated with the device. The process 800 may also include identifying a user device associated with the second account data and sending the first data to the user device.

Additionally, or alternatively, the process 800 may include determining that the action corresponds to output of content by the device. In these examples, the process 800 may include identifying the application from multiple applications associated with the first account data, the application configured to provide the content and/or causing the device to output the content.

Additionally, or alternatively, the process 800 may include determining that the action corresponds to operation of an electronic device associated with the second account data. In these examples, the process 800 may include identifying the application from multiple applications associated with the second account data, the application configured for control of the electronic device and/or causing operation of the electronic device.

Additionally, or alternatively, the process 800 may include determining a second device associated with the second account data. The process 800 may also include causing the first account data to be associated with the second device based at least in part on the second device being associated with the second account data.

Figure 9:
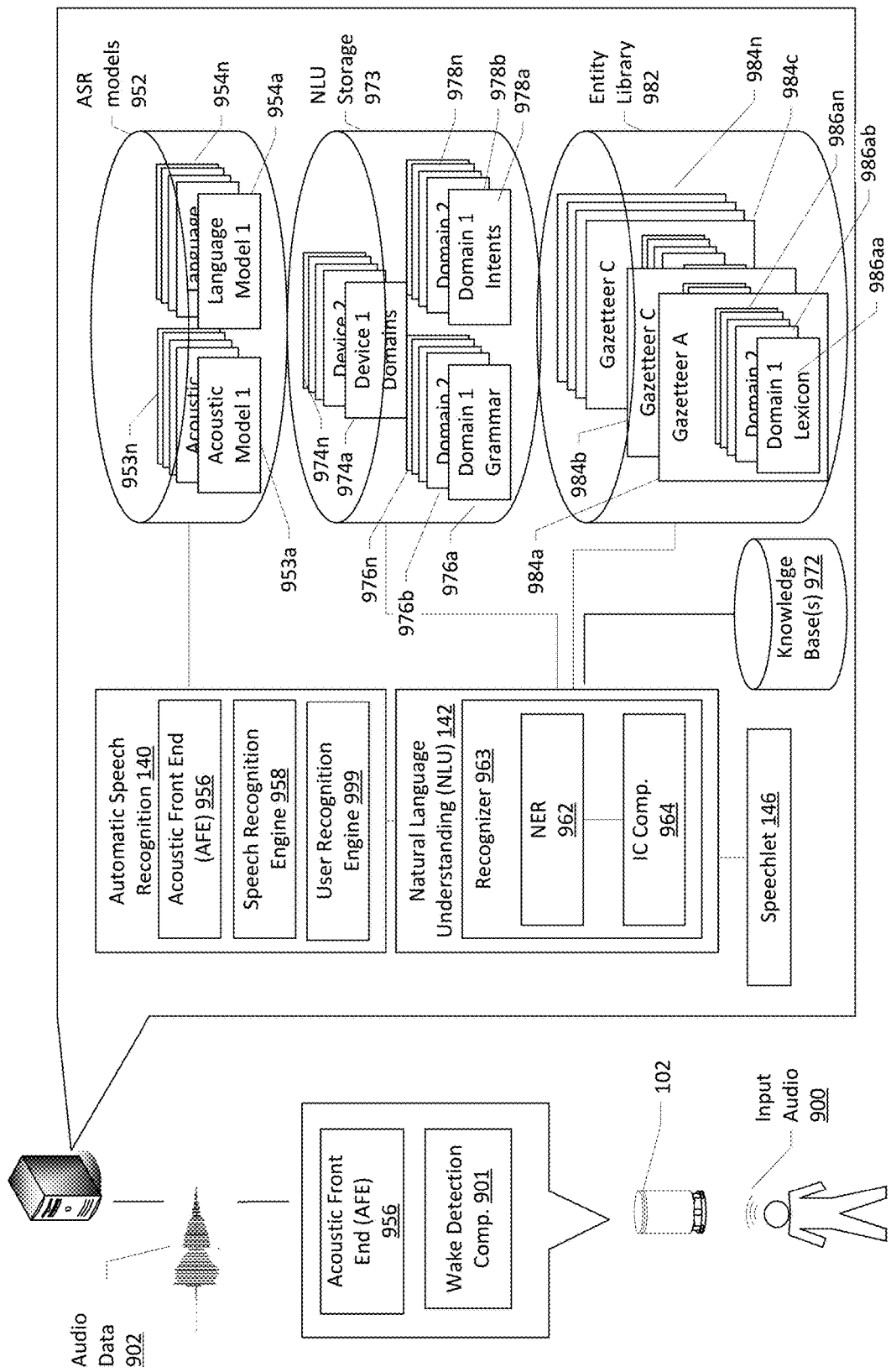
FIG. 9 illustrates a conceptual diagram of components of a speech-processing system for processing audio data provided by one or more devices.

FIG. 9 illustrates a conceptual diagram of components of a speech-processing system for processing audio data provided by one or more devices. FIG. 9 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 9 may occur directly or across a network 108. An audio capture component, such as a microphone 116 of the device 102, or another device, captures audio 900 corresponding to a spoken utterance. The device 102, using a wake-word component 901, then processes audio data corresponding to the audio 900 to determine if a keyword (such as a wakeword) is detected in the audio data. Following detection of a wakeword, the device 102 sends audio data 902 corresponding to the utterance to the remote system 106 that includes an ASR component 140. The audio data 902 may be output from an optional acoustic front end (AFE) 956 located on the device prior to transmission. In other instances, the audio data 902 may be in a different form for processing by a remote AFE 956, such as the AFE 956 located with the ASR component 140 of the remote system 106.

The wake-word component 901 works in conjunction with other components of the user device, for example a microphone to detect keywords in audio 900. For example, the device may convert audio 900 into audio data, and process the audio data with the wake-word component 901 to determine whether human sound is detected, and if so, if the audio data comprising human sound matches an audio fingerprint and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 901 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio fingerprints, or other data to determine if the incoming audio "matches" stored audio data corresponding to a keyword.

Thus, the wake-word component 901 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 902 corresponding to input audio 900 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 902 may include data corresponding to the wakeword, or the portion of the audio data corresponding to the wakeword may be removed by the local device 102 prior to sending. Further, a local device may "wake" upon detection of speech/spoken audio above a threshold, as described herein. Upon receipt by the remote system 106, an ASR component 140 may convert the audio data 902 into text. The ASR transcribes audio data into text data representing the words of the speech contained in the audio data 902. The text data may then be used by other components for various purposes, such as executing system commands, inputting data, etc. A spoken utterance in the audio data is input to a processor configured to perform ASR which then interprets the utterance based on the similarity between the utterance and pre-established language models 954 stored in an ASR model knowledge base (ASR Models Storage 952). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 953 stored in an ASR Models Storage 952), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 140 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 956 and a speech recognition engine 958. The acoustic front end (AFE) 956 transforms the audio data from the microphone into data for processing by the speech recognition engine 958. The speech recognition engine 958 compares the speech recognition data with acoustic models 953, language models 954, and other data models and information for recognizing the speech conveyed in the audio data. The AFE 956 may reduce noise in the audio data and divide the digitized audio data into frames representing time intervals for which the AFE 956 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the output from the AFE 956 with reference to information stored in speech/model storage (952). Alternatively, post front-end processed data (such as feature vectors) may be received by the device executing ASR processing from another source besides the internal AFE. For example, the user device may process audio data into feature vectors (for example using an on-device AFE 956) and transmit that information to a server across a network for ASR processing. Feature vectors may arrive at the remote system 106 encoded, in which case they may be decoded prior to processing by the processor executing the speech recognition engine 958.

The speech recognition engine 958 attempts to match received feature vectors to language phonemes and words as known in the stored acoustic models 953 and language models 954. The speech recognition engine 958 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, play my rock playlist?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 958 may identify, determine, and/or generate text data corresponding to the user utterance, here "play my rock playlist."

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. The user recognition engine 999 may be utilized to determine a user profile and/or user identifier associated with the user that provided the user utterance. The user recognition engine 999 will be described in more detail with respect to FIG. 15, below.

Following ASR processing, the ASR results may be sent by the speech recognition engine 958 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 142 (e.g., server 106) may include various components, including potentially dedicated processor(s), memory, storage, etc. As shown in FIG. 9, an NLU component 142 may include a recognizer 963 that includes a named entity recognition (NER) component 962 which is used to identify portions of query text that correspond to a named entity that may be recognizable by the system. A downstream process called named entity resolution links a text portion to a specific entity known to the system. To perform named entity resolution, the system may utilize gazetteer information (984a-984n) stored in entity library storage 982. The gazetteer information may be used for entity resolution, for example matching ASR results with different entities (such as voice interface devices, smart devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 140 based on the utterance input audio 900) and attempts to make a semantic interpretation of the text. That is, the NLU process determines the meaning behind the text based on the individual words and then implements that meaning. NLU processing 142 interprets a text string to derive an intent or a desired action from the user as well as the pertinent pieces of information in the text that allow a device (e.g., device 102) to complete that action. For example, if a spoken utterance is processed using ASR 140 and outputs the text "play my rock playlist" the NLU process may determine that the user intended to have audio be output of songs associated with a "rock playlist."

The NLU may process several textual inputs related to the same utterance. For example, if the ASR 140 outputs N text segments (as part of an N-best list), the NLU may process all N outputs to obtain NLU results.

As will be discussed further below, the NLU process may be configured to parse and tag to annotate text as part of NLU processing. For example, for the text "play my rock playlist," "play" may be tagged as a command (to output audio) and "my rock playlist" may be tagged as the naming identifier of the content to be displayed.

To correctly perform NLU processing of speech input, an NLU process 142 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 962 receives a query in the form of ASR results and attempts to identify relevant grammars and lexical information that may be used to construe meaning. To do so, the NLU component 142 may begin by identifying potential domains that may relate to the received query. The NLU storage 973 includes a database of devices (974a-974n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home," "communications," "shopping," "music," "calendaring," etc. As such, each domain may be associated with a particular recognizer 963, language model and/or grammar database (976a-976n), a particular set of intents/actions (978a-978n), and a particular personalized lexicon (986). Each gazetteer (984a-984n) may include domain-indexed lexical information associated with a particular user and/or device. For example, the Gazetteer A (984a) includes domain-index lexical information 986aa to 986an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 964 parses the query to determine an intent or intents for each identified domain, where the intent corresponds to the action to be performed that is responsive to the query. Each domain is associated with a database (978a-978n) of words linked to intents. For example, A/V intent database may link words and phrases such as "turn on," "activate," and/or "enable," to a "turn on" intent. By way of further example, a timer intent database may link words and phrases such as "set," "start," "initiate," and "enable" to a "set timer" intent. A voice-message intent database, meanwhile, may link words and phrases such as "send a message," "send a voice message," "send the following," or the like. The IC component 964 identifies potential intents for each identified domain by comparing words in the query to the words and phrases in the intents database 978. In some instances, the determination of an intent by the IC component 964 is performed using a set of rules or templates that are processed against the incoming text to identify a matching intent.

In order to generate a particular interpreted response, the NER 962 applies the grammar models and lexical information associated with the respective domain to actually recognize a mention of one or more entities in the text of the query. In this manner, the NER 962 identifies "slots" or values (i.e., particular words in query text) that may be needed for later command processing. Depending on the complexity of the NER 962, it may also label each slot with a type of varying levels of specificity (such as noun, place, device name, device location, city, artist name, song name, amount of time, timer number, or the like). Each grammar model 976 includes the names of entities (i.e., nouns) commonly found in speech about the particular domain (i.e., generic terms), whereas the lexical information 986 from the gazetteer 984 is personalized to the user(s) and/or the device. For instance, a grammar model associated with the shopping domain may include a database of words commonly used when people discuss shopping.

The intents identified by the IC component 964 are linked to domain-specific grammar frameworks (included in 976) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "turn on" is an identified intent, a grammar (976) framework or frameworks may correspond to sentence structures such as "cause device with {Bedroom Light} identifier to turn on."

For example, the NER component 962 may parse the query to identify words as subject, object, verb, preposition, etc., based on grammar rules and/or models, prior to recognizing named entities. The identified verb may be used by the IC component 964 to identify intent, which is then used by the NER component 962 to identify frameworks. A framework for the intent of "play a song," meanwhile, may specify a list of slots/fields applicable to play the identified "song" and any object modifier (e.g., specifying a music collection from which the song should be accessed) or the like. The NER component 962 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 962 may search the database of generic words associated with the domain (in the knowledge base 972). So, for instance, if the query was "identify this song," after failing to determine which song is currently being output, the NER component 962 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to a speechlet 146. The destination speechlet 146 may be determined based on the NLU output. For example, if the NLU output includes a command to send a message, the destination speechlet 146 may be a message sending application, such as one located on the user device or in a message sending appliance, configured to execute a message sending command. If the NLU output includes a search request, the destination speechlet 146 may include a search engine processor, such as one located on a search server, configured to execute a search command. After the appropriate command is generated based on the intent of the user, the speechlet 146 may provide some or all of this information to a text-to-speech (TTS) engine. The TTS engine may then generate an actual audio file for outputting the audio data determined by the speechlet 146 (e.g., "okay," or "playing your rock playlist"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 142 during runtime operations where NLU operations are performed on text (such as text output from an ASR component 140). Each domain may have specially configured components to perform various steps of the NLU operations.

For example, in an NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 963. Each recognizer may include various NLU components such as an NER component 962, IC component 964 and other components such as an entity resolver, or other components.

For example, a messaging domain recognizer 963-A (Domain A) may have an NER component 962-A that identifies what slots (i.e., portions of input text) may correspond to particular words relevant to that domain. The words may correspond to entities such as (for the messaging domain) a recipient. An NER component 962 may use a machine learning model, such as a domain specific conditional random field (CRF) to both identify the portions corresponding to an entity as well as identify what type of entity corresponds to the text portion. The messaging domain recognizer 963-A may also have its own intent classification (IC) component 964-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

Figure 10:
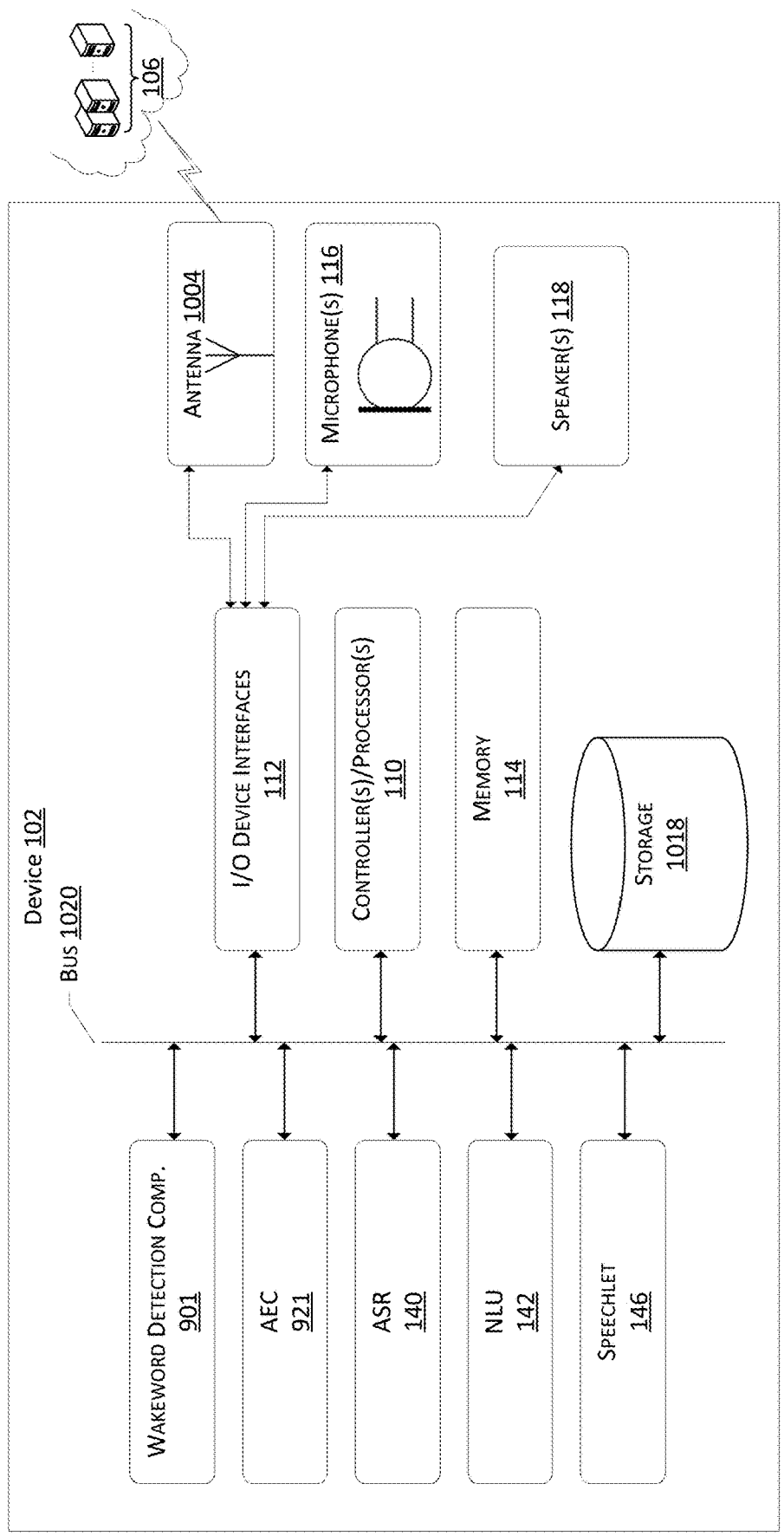
FIG. 10 illustrates a conceptual diagram of example components of a computing device configured to associate accounts with devices.

FIG. 10 illustrates a conceptual diagram of example components of an electronic device configured to associate account data with voice interface devices. For example, the device may include one or more electronic devices such as voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. A second user profile may also be associated with one or more other electronic devices, which may be situated in home or other place associated with the second user profile, for example. The device 102 may be implemented as a standalone device that is relatively simple in terms of functional capabilities with limited input/output components, memory, and processing capabilities. For instance, the device 102 may not have a keyboard, keypad, touchscreen, or other form of mechanical input. In some instances, the device 102 may include a microphone 116, a power source, and functionality for sending generated audio data via one or more antennas 1004 to another device and/or system.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include input devices such as a keyboard, a mouse, a touchscreen, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 116, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 10 may include one or more controllers/processors 110, that may include a central processing unit (CPU) for processing data and computer-readable instructions, and memory 114 for storing data and instructions of the device 102. In examples, the skills and/or applications described herein may be stored in association with the memory 114, which may be queried for content and/or responses as described herein. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 108, using the memory 114 as "working" storage at runtime. A device's computer instructions may be stored in a non-transitory manner in non-volatile memory 114, storage 1018, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 1020 for conveying data among components of the respective device. Each component within a device 102 may also be directly connected to other components in addition to, or instead of, being connected to other components across the bus 1020.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display. As a way of indicating to a user that a connection between another device has been opened, the device 102 may be configured with one or more visual indicators, such as the light element(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 116 or array of microphones, a wired headset or a wireless headset, etc. The microphone 116 may be configured to capture audio. If an array of microphones is included, approximate distance to a sound's point of origin may be determined using acoustic localization based on time and amplitude differences between sounds captured by different microphones of the array. The device 102 (using microphone 116, wakeword detection component 1001, ASR component 140, etc.) may be configured to generate audio data corresponding to captured audio. The device 102 (using input/output device interfaces 112, antenna 1004, etc.) may also be configured to transmit the audio data to the remote system 106 for further processing or to process the data using internal components such as a wakeword detection component 901.

Via the antenna(s) 1004, the input/output device interface 112 may connect to one or more networks via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s), the system may be distributed across a networked environment. Accordingly, the device 102 and/or the remote system 106 may include an ASR component 140. The ASR component 140 of device 102 may be of limited or extended capabilities. The ASR component 140 may include language models stored in ASR model storage component, and an ASR component 140 that performs automatic speech recognition. If limited speech recognition is included, the ASR component 140 may be configured to identify a limited number of words, such as keywords detected by the device, whereas extended speech recognition may be configured to recognize a much larger range of words.

The device 102 and/or the remote system 106 may include a limited or extended NLU component 142. The NLU component 142 of device 102 may be of limited or extended capabilities. The NLU component 142 may comprise a name entity recognition module, an intent classification module and/or other components. The NLU component 142 may also include a stored knowledge base and/or entity library, or those storages may be separately located.

In examples, AEC may also be performed by the device 102. In these examples, the operations may include causing the AEC component 921 to be enabled or otherwise turned on, or the operations may include causing the AEC component 921 to transition from a first mode to a second mode representing a higher sensitivity to audio data generated by the microphone 116. The AEC component 921 may utilize the audio data generated by the microphone 116 to determine if an audio fingerprint of the audio data, or portion thereof, corresponds to a reference audio fingerprint associated with the predefined event.

The device 102 and/or the remote system 106 may also include a speechlet 146 that is configured to execute commands/functions associated with a spoken command as described herein. The device 102 may include a wakeword detection component 901, which may be a separate component or may be included in an ASR component 140. The wakeword detection component 901 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred.

Figure 11:
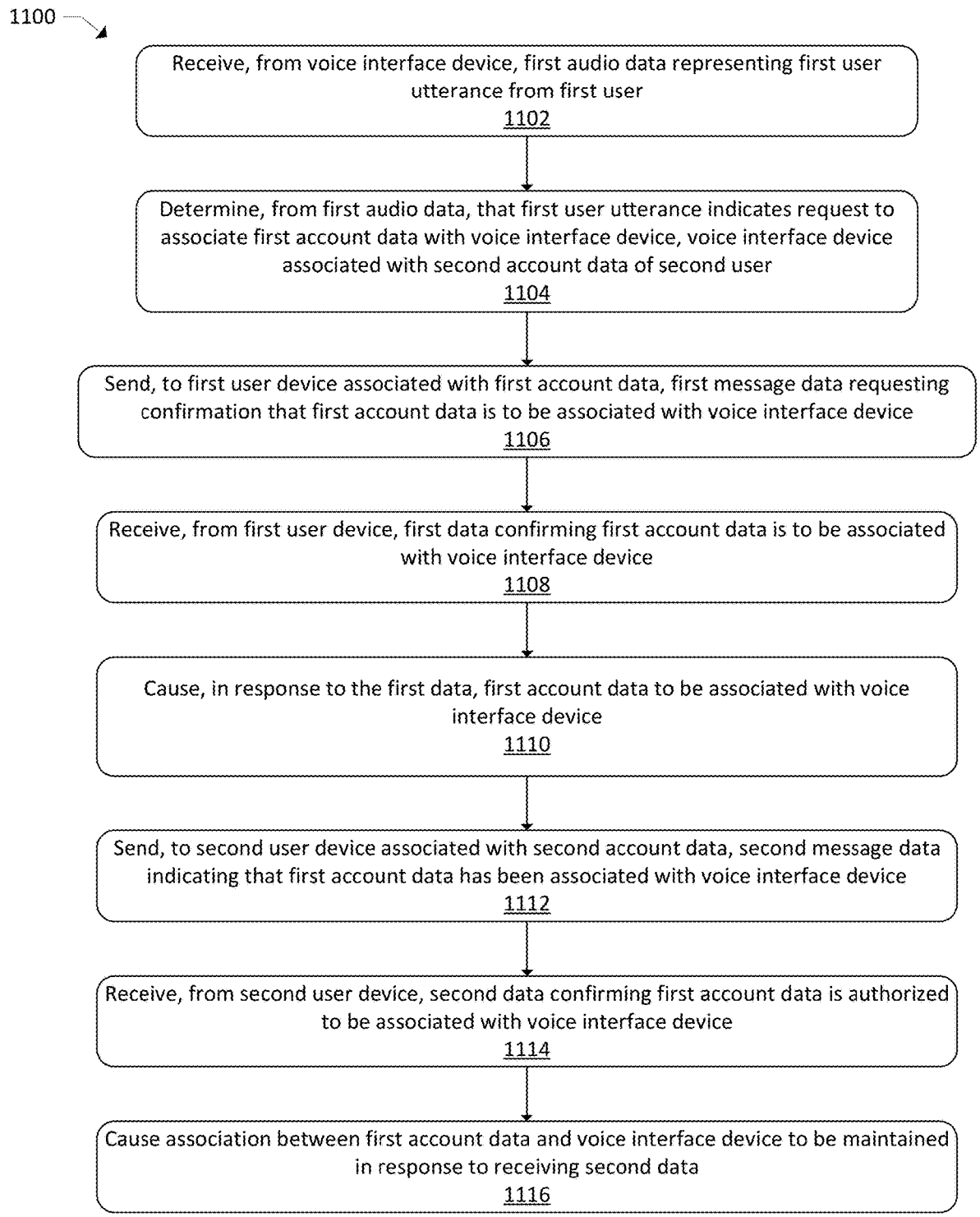
FIG. 11 illustrates a flow diagram of an example process for authentication of account data association with devices.
Figure 12:
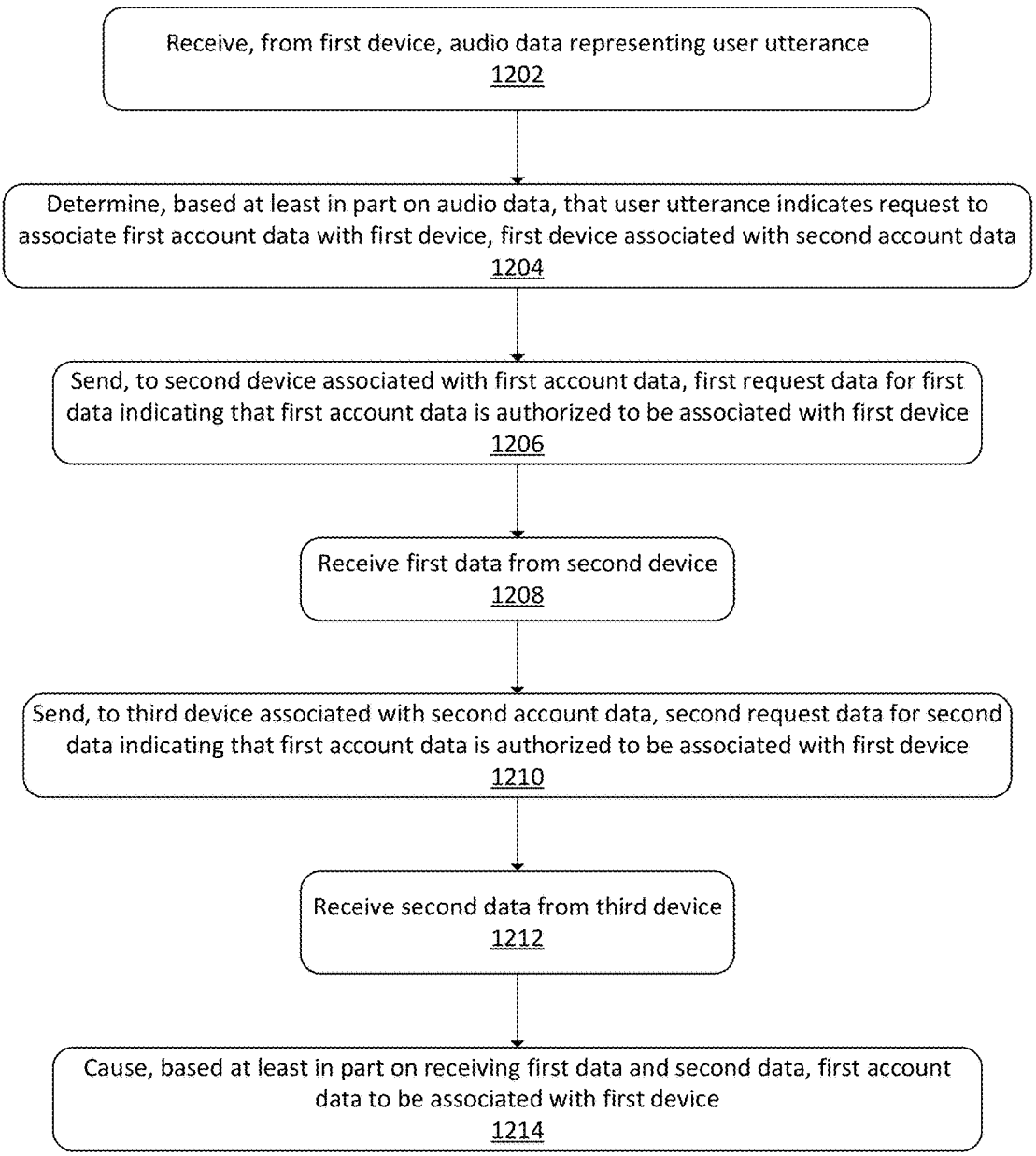
FIG. 12 illustrates a flow diagram of another example process for authentication of account data association with devices.

FIGS. 11 and 12 illustrates processes for account data association with voice interface devices. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-10, although the processes may be implemented in a wide variety of other environments, architectures and systems.

FIG. 11 illustrates a flow diagram of an example process 1100 for generation of user identifier data for natural language processing and application use. The order in which the operations or steps are described is not intended to be construed as a limitation, and any number of the described operations may be combined in any order and/or in parallel to implement process 1100.

At block 1102, the process 1100 may include receiving, from a voice interface device, first audio data representing a first user utterance from a first user. For example, the user may speak the phrase "connect me here." Microphones of the voice interface device may capture this audio, generate corresponding audio data, and send the audio data to a remote system.

At block 1104, the process 1100 may include determining, from the first audio data, that the first user utterance indicates a request to associate first account data with the voice interface device, the voice interface device associated with second account data of a second user. For example, the remote system may determine that the user utterance includes the phrase "connect me here" or a similar phrase, and may utilize a guest speechlet configured to handle performance of operations associated with such an utterance to initiate account data association.

At block 1106, the process 1100 may include sending, to a first user device associated with the first account data, first message data requesting confirmation that the first account data is to be associated with the voice interface device. For example, the system may perform voice recognition processes as described herein to identify the user that provided the user utterance. The identity of the user may be utilized to identify the first account data associated with the user identity, and the first account data may be utilized to identify the first user device. The message data may include information indicating that an attempt to associate the first account data with a voice interface device has been made and requesting input from a user of the first user device confirming that association of the first account data with the voice interface device is authorized. In other examples, the message data may be a request for a location associated with the first user device and/or a request for data indicating that the first user device is connected to a network access point associated with the voice interface device.

At block 1108, the process 1100 may include receiving, from the first user device, first data confirming the first account data is to be associated with the voice interface device. For example, the first data may include input data corresponding to input from a user of the first user device, such as the user selecting a portion of a screen of the first user device indicating confirmation of the request to associate the first account data with the voice interface device. In other examples, the first data may include an indication that the first user device is within a threshold distance of the voice interface device and/or that the first user device is connected to a network access point associated with the voice interface device.

At block 1110, the process 1100 may include causing, in response to the first data, the first account data to be associated with the voice interface device. For example, the remote system may store data indicating that when audio data representing user utterances are received from the device, the first account data or the second account data may be utilized to respond to the user utterances.

At block 1112, the process 1100 may include sending, to a second user device associated with the second account data, second message data requesting confirmation that the first account data is authorized to be associated with the voice interface device. For example, a device identifier of the voice interface device from which the audio data was received may be utilized to determine the second account data. The second account data may be utilized to determine the second user device associated with the second account data. The message data may include information indicating that an attempt to associate the first account data with the voice interface device has been made and requesting input from a user of the second user device confirming that association of the first account data with the voice interface device is authorized.

At block 1114, the process 1100 may include receiving, from the second user device, second data confirming the first account data is authorized to be associated with the voice interface device. The second data may be received in the same or a similar manner as receipt of the first data with respect to block 1108.

At block 1116, the process 1100 may include causing an association between the first account data and the voice interface device to be maintained in response to receiving the second data. In other examples where the second data indicates that association of the first account data is not authorized by the host profile, the first account data may be dissociated from the voice interface device.

Additionally, or alternatively, the process 1100 may include receiving request data to perform an action by an electronic device associated with the first account data. The process 1100 may also include determining, utilizing the first account data, device identifier data indicating electronic devices associated with the first account data. The process 1100 may also include sending, to the electronic device, the device identifier data indicating that the electronic devices is a candidate device for performing the action. The process 1100 may also include receiving, from the electronic device, third data indicating the action to be performed and the electronic device of the electronic devices to perform the action. The process 1100 may also include causing the electronic device to perform the action.

Additionally, or alternatively, the process 1100 may include receiving, from the voice interface device, second audio data representing a second user utterance. The process 1100 may also include determining that the second user utterance is associated with the second account data instead of the first account data. The process 1100 may also include determining intent data indicating that the second user utterance is requesting content associated with an application and determining that the application is associated with the first account data. The process 1100 may also include sending a command to the voice interface device to output the content.

Additionally, or alternatively, the process 1100 may include receiving, while the first account data is associated with the voice interface device, input data from the first user device, the input data requesting that subsequent association between the first account data and the voice interface device be enabled without device re-authentication. The process 1100 may also include generating, in response to receiving the input data, third data indicating that association between the first account data and the voice interface device be enabled without device re-authentication. The process 1100 may also include storing the third data in association with the first account data and receiving, from the voice interface device, second audio data representing a second user utterance to associate the first account data with the voice interface device. The process 1100 may also include determining that the second user utterance is associated with the first account data and causing the first account data to be associated with the voice interface device without device re-authentication.

FIG. 12 illustrates a flow diagram of another example process 1200 for generation of user identifier data for natural language processing and application use. The order in which the operations or steps are described is not intended to be construed as a limitation, and any number of the described operations may be combined in any order and/or in parallel to implement process 1200.

At block 1202, the process 1200 may include receiving, from a first device, audio data representing a user utterance. For example, the user may speak the phrase "connect me here." Microphones of the voice interface device may capture this audio, generate corresponding audio data, and send the audio data to a remote system.

At block 1204, the process 1200 may include determining, based at least in part on the audio data, that the user utterance indicates a first request to associate first account data with the first device, the first device associated with second account data. For example, the remote system may determine that the user utterance includes the phrase "connect me here" or a similar phrase, and may utilize a guest speechlet configured to handle performance of operations associated with such an utterance to initiate account data association.

At block 1206, the process 1200 may include sending, to a second device associated with the first account data, first request data for first data indicating that the first account data is authorized to be associated with the first device. For example, the system may perform voice recognition processes as described herein to identify the user that provided the user utterance. The identity of the user may be utilized to identify the first account data associated with the user identity, and the first account data may be utilized to identify the second device. The message data may include information indicating that an attempt to associate the first account data with a first device has been made and requesting input from a user of the second device confirming that association of the first account data with the first device is authorized. In other examples, the message data may be a request for a location associated with the second device and/or a request for data indicating that the second device is connected to a network access point associated with the first device.

At block 1208, the process 1200 may include receiving the first data from the second device. For example, the first data may include input data corresponding to input from a user of the second device, such as the user selecting a portion of a screen of the second device indicating confirmation of the request to associate the first account data with the first device. In other examples, the first data may include an indication that the second device is within a threshold distance of the first device and/or that the second device is connected to a network access point associated with the first device.

At block 1210, the process 1200 may include sending, to a third device associated with the second account data, second request data for second data indicating that the first account data is authorized to be associated with the first device. For example, a device identifier of the first device from which the audio data was received may be utilized to determine the second account data. The second account data may be utilized to determine the third device associated with the second account data. The request may include information indicating that an attempt to associate the first account data with the first device has been made and requesting input from a user of the third device confirming that association of the first account data with the first device is authorized.

At block 1212, the process 1200 may include receiving the second data from the third device. The second data may be received in the same or a similar manner as receipt of the first data with respect to block 1208.

At block 1214, the process 1200 may include causing, based at least in part on receiving the first data and the second data, the first account data to be associated with the first device. For example, the remote system may store data indicating that when audio data representing user utterances are received from the device, the first account data or the second account data may be utilized to respond to the user utterances.

Additionally, or alternatively, the process 1200 may include receiving a fourth request to perform an action by a fourth device associated with the first account data. The process 1200 may also include determining, based at least in part on the first account data, device identifier data indicating devices associated with the first account data. The process 1200 may also include sending, to an application associated with the first account data, the device identifier data indicating that the devices are candidate devices for performing the action. The process 1200 may also include receiving, from the application, third data indicating the fourth device of the devices to perform the action and causing the fourth device to perform the action.

Additionally, or alternatively, the process 1200 may include receiving, from the first device, second audio data representing a second user utterance. The process 1200 may also include determining that the second user utterance is associated with the second account data instead of the first account data and determining intent data indicating that the second user utterance is requesting content associated with an application. The process 1200 may also include determining that the application is unassociated with the second account data and enabling the application for use in association with the second account data on the first device.

Additionally, or alternatively, the process 1200 may include receiving, while the first account data is associated with the first device, input data from the second device, the input data requesting that subsequent association between the first account data and the first device be enabled without device authentication. The process 1200 may also include generating, based at least in part on receiving the input data, third data indicating that association between the first account data and the first device be enabled without device authentication. The process 1200 may also include storing the third data in association with the first account data and receiving, from the first device, second audio data representing a second user utterance to associate the first account data with the first device. The process 1200 may also include determining that the second user utterance is associated with the first account data and causing the first account data to be associated with the first device without device authentication.

Additionally, or alternatively, the process 1200 may include receiving, while the first account data is associated with the first device, input data from the second device, the input data requesting that subsequent association between the first account data and the first device be enabled when the second device is connected to a network access point associated with the first device. The process 1200 may also include generating, based at least in part on receiving the input data, third data indicating that association between the first account data and the first device be enabled when the second device is connected to the network access point. The process 1200 may also include storing the third data in association with the first account data and receiving fourth data indicating that the second device is connected to the network access point. The process 1200 may also include causing the first account data to be associated with the first device based at least in part on receiving the second data.

Additionally, or alternatively, the process 1200 may include generating third data indicating that an action has been performed in association with the first account data. The process 1200 may also include storing the third data in association with a first activity feed associated with the first account data and determining to refrain from storing the third data in association with a second activity feed associated with the second account data based at least in part on the action being performed in association with the first account data.

Additionally, or alternatively, the process 1200 may include generating third data indicating that an action has been performed by the first device in association with the first account data while the first account data is associated with the first device. The process 1200 may also include storing a first instance of the third data in association with a first activity feed associated with the first account data and storing a second instance of the third data in association with a second activity feed associated with the second account data based at least in part on the action being performed by the first device.

Additionally, or alternatively, the process 1200 may include determining, based at least in part on the first account data being associated with the first device, first device identifier data indicating first electronic devices associated with the first account data. The process 1200 may also include determining, based at least in part on receiving the audio data from the first device, second device identifier data indicating second electronic devices associated with the second account data. The process 1200 may also include sending, to an application configured to cause an action to be performed in response to input data requesting performance of the action, the first device identifier data. The process 1200 may also include sending, to the application, the second device identifier data and receiving, from the application, third data indicating an electronic device of one of the first electronic devices or the second electronic devices to perform the action.

Figure 13:
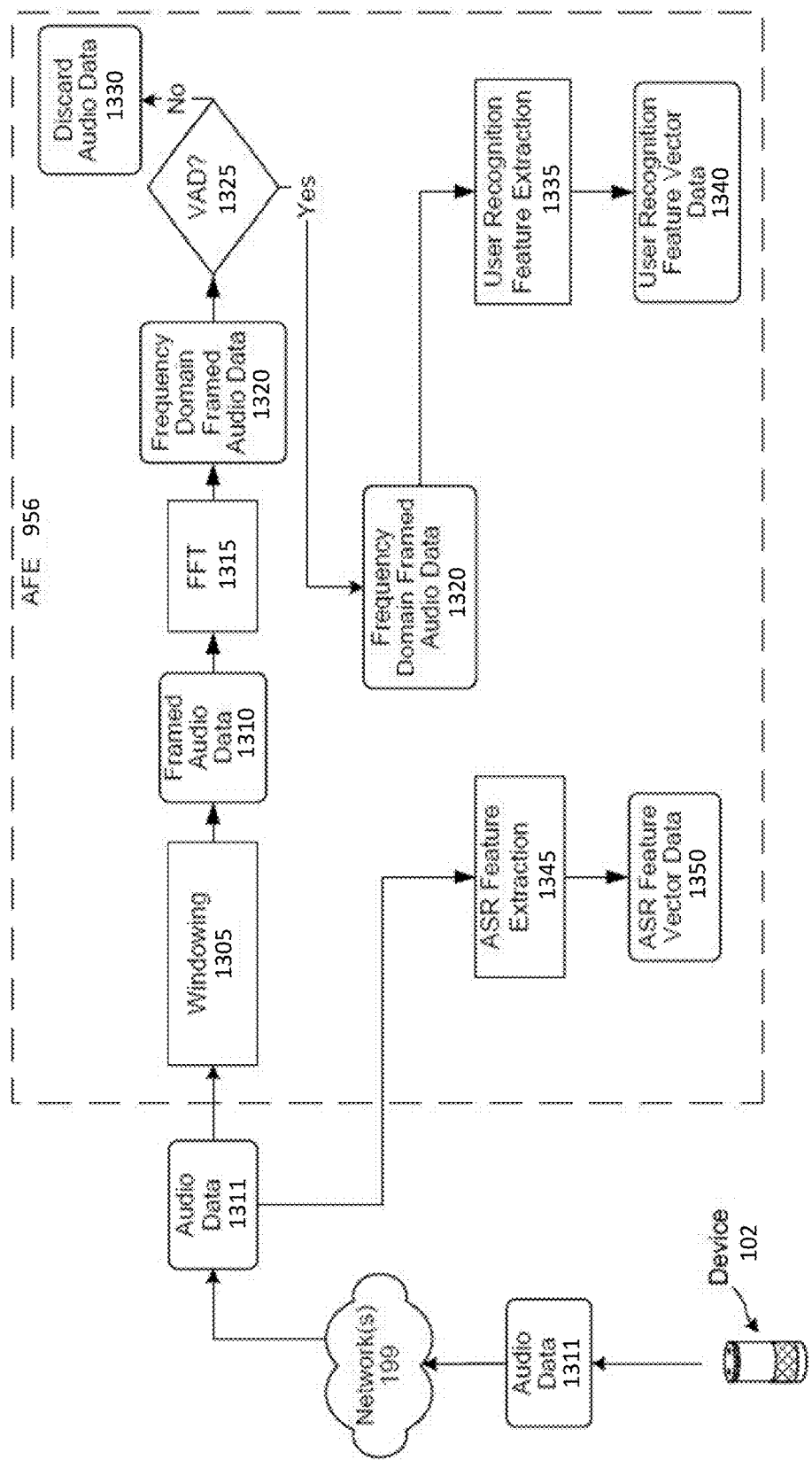
FIG. 13 is a flow diagram illustrating processing that may be performed to prepare audio data for ASR processing and user recognition processing according to embodiments of the present disclosure.

FIG. 13 illustrates processing that may be performed to prepare the audio data 1311 for ASR processing and user recognition processing. As described, the device 102 sends the audio data 1311 through a network(s) 199 to the system(s) for processing. The system(s) may include an acoustic front end (AFE) 956 (or other component(s)) that performs various functions on the audio data 1311 to prepare the audio data 1311 for further downstream processing, such as ASR processing and/or user recognition processing. For example, the AFE 956 may include a windowing component 705 that performs windowing functions on the audio data 1311 to create framed audio data 1310 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 956 may include a fast Fourier transform (FFT) component 1315 configured to perform FFT to convert the waveforms in each frame of the framed audio data 1310 from its original domain (e.g., time) to a representation in a frequency domain (thereby creating frequency domain framed audio data 1320). Audio processing techniques other than or in addition to FFT may be used to transform audio data (e.g., waveforms) into data that can be processed as needed.

The AFE 956 may include a voice activity detection (VAD) component 1325 that determines whether voice activity (i.e., speech) is present in the post-FFT waveforms (i.e., frequency domain framed audio data 1320). In doing so, the system(s) may perform VAD operations discussed above. The VAD detector (or other component) may be configured in a different order, for example the VAD detector may operate on the audio data 1311 rather than on the frequency domain framed audio data 1320, may operate on ASR features, etc. Various different configurations of components are possible. If there is no speech in the frequency domain framed audio data 1320, the system(s) discards (1330) the frequency domain framed audio data 1305 (i.e., removes the audio data from the processing stream). If, instead, the system(s) detects speech in the frequency domain framed audio data 1320, the system(s) executes a user recognition feature extraction component 1335 with respect to the frequency domain framed audio data 1320.

The user recognition feature extraction component 1335 may perform frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 1340). The user recognition feature extraction component 1335 may continue to process until voice activity is no longer detected in the frequency domain framed audio data 1320, at which point the system(s) may determine that an endpoint of the speech has been reached.

An ASR feature extraction component 1345 may perform ASR feature extraction on all of the audio data 1311 received from the device 102. Alternatively (not illustrated), the ASR feature extraction component 1345 may only perform ASR feature extraction on audio data including speech (e.g., as indicated by the VAD component 1325). The ASR feature extraction component 1345 and/or the user recognition feature extraction component 735 may determine values (i.e., features) representing qualities of the frequency domain framed audio data 1320, along with quantitating those features into values (i.e., feature vectors or audio feature vectors). The ASR feature extraction component 1345 may determine ASR feature vector data 1350 useful for ASR processing, and the user recognition feature extraction component 1335 may determine user recognition feature vector data 1340 (sometimes called an i-vector) useful for user recognition processing. The ASR feature vector data 1350 and the user recognition feature vector data 1340 may be the same feature vectors, different feature vectors, or may include some overlapping features. A number of approaches may be used to extract feature vectors from the frequency domain framed audio data 1320, such as MFCCs, PLP techniques, neural network feature vector techniques, linear discriminant analysis, semi-tied covariance matrices, or other approaches known to those skilled in the art.

The ASR feature vector data 1350 may include a different audio feature vector for each audio frame. Thus, for one 25 ms long audio frame, the ASR feature extraction component 1345 may output a single ASR feature vector. The ASR feature vector data 1350 may be input to the ASR component 140.

Depending on system configuration, the user recognition feature extraction component 1335 may output multiple user recognition feature vectors, for example one such vector for each audio frame. Alternatively, the user recognition feature extraction component 1335 may continue to input the frequency domain framed audio data 1320 while the utterance is ongoing (e.g., before the endpoint of the speech is reached in the audio data 1311). While the frequency domain framed audio data 1320 is input, the user recognition feature extraction component 1335 may accumulate or otherwise combine the frequency domain framed audio data 1320 as it comes in. That is, for a certain frame's worth of frequency domain framed audio data 1320 that comes in, the user recognition feature extraction component 1335 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 1335 may depend on what audio qualities are determined to be important for ultimate user recognition processing. Thus, the user recognition feature extraction component 1335 may be trained to isolate and process data that is most useful for user recognition processing. The output of the user recognition feature extraction component 1335 may thus include user recognition feature vector data 1340 that includes values for features useful for user recognition processing. The resulting user recognition feature vector data 1340 may be input to the user recognition engine 999.

The user recognition feature vector data 1340 may include multiple vectors each corresponding to different portions of a spoken user input. Alternatively, the user recognition feature vector data 1340 may be a single vector representing audio qualities of the spoken user input.

Figure 14:
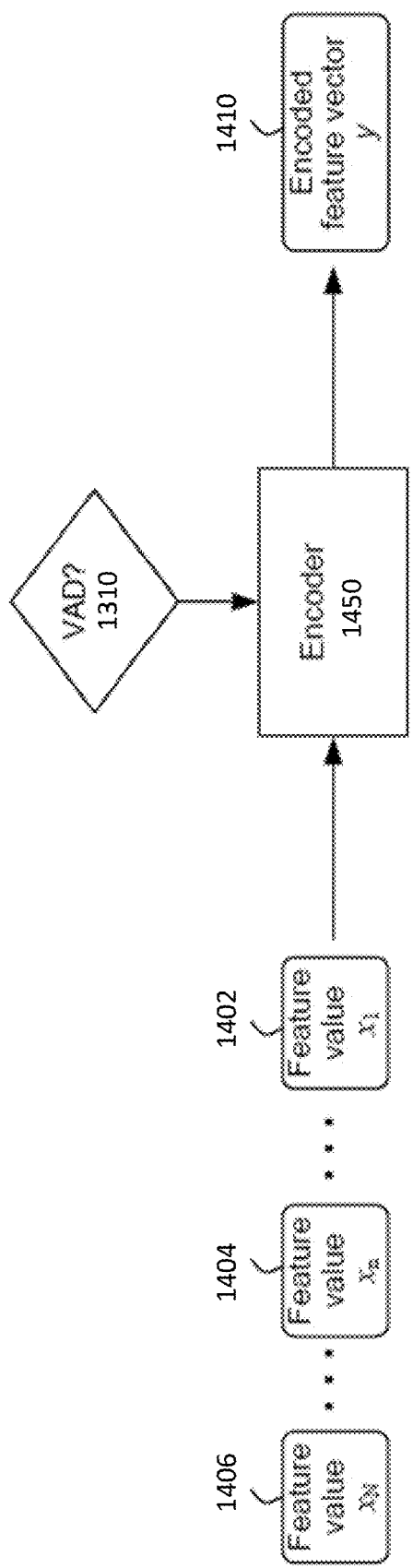
FIG. 14 is a diagram of a vector encoder according to embodiments of the present disclosure.

Referring to FIG. 14, the single vector may be created using an encoder 1450, which can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations. As shown in FIG. 14, feature values 1402 through 1406 (which may include feature vectors of the audio data 1311, the frequency domain framed audio data 1320, or the like) may be input into an encoder 1450, which will output an encoded feature vector 1410 that represents the input feature values. Output of the VAD component 1325 may be an input into the encoder 1450 such that the encoder 1450 may only operate when feature values input therein correspond to speech. The individual feature values (e.g., 1402-1406) may correspond to specific audio frames. Regardless of how many feature values are input, any particular encoder 1450 will be configured to output vectors of the same size, thus ensuring a continuity of output encoded vector size from any particular encoder 850 (though different encoders may output vectors of different fixed sizes) and enabling comparing different feature vectors y. The value y may be called an embedding of the sequence $x_1$, ... $x_N$. The length of $x_n$ and y are fixed and known a-priori, but the length of N of feature sequence $x_1$, ... $x_N$ is not necessarily known a-priori. The encoder 850 may be implemented as a neural network (NN), recurrent neural network (RNN), GMM, or other model. One particular example is a long short-term memory (LSTM) RNN. There are a variety of ways for the encoder 1450 to consume data input therein, including but not limited to:

linear, one direction (forward or backward),
    bi-linear, essentially the concatenation of a forward and a backward embedding, or
    tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 14 illustrates operation of the encoder 1450. The input feature value sequence, starting with feature value $x_1$ 1402, continuing through feature value $x_n$ 1404, and concluding with feature value $x_N$ 1406 is input into the encoder 1450. The encoder 1450 may process the input feature values as noted above. The encoder 1450 outputs the encoded feature vector y 1410, which is a fixed length feature vector of length F. Thus, the user recognition feature extraction component 1335 may include an encoder 1450 that receives audio feature values for a particular spoken user input, and outputs a fixed length encoded feature vector y 1410, which may be the user recognition feature/vector data 1340. Thus, in certain system configurations, no matter how long the spoken user input is, or how many acoustic frames worth of feature values are input into the encoder 1450, the output feature vector 1410/1340 will be of the same length, thus allowing for more ease of performing user recognition processing by the user recognition engine 999. To allow for robust system operation, a final vector 1410/1340 may include many dimensions (e.g., several hundred), thus providing many datapoints for downstream consideration.

To determine the user recognition feature vector data 1340, the system(s) may (for example using the VAD component 1325) determine that voice activity is detected in input audio data. This may indicate the beginning of the spoken user input, thus resulting in the system(s) determining that the spoken user input starts at a first point in audio data. Audio processing (for example performed by the windowing component 1305, the FFT component 1315, the ASR feature extraction component 1345, the user recognition feature extraction component 1335, ASR processing, or the like) may continue on audio data starting at the first point and continuing until the VAD component 1325 determines that voice activity is no longer detected at a second point in audio data. Thus, the system(s) may determine that the spoken user input ends at the second point. Thus, the first point may be considered the beginpoint of the spoken user input and the second point may be considered the endpoint of the spoken user input. The VAD component 1325 may signal the user recognition feature extraction component 1335 when the beginpoint and/or endpoint is detected so that the user recognition feature extraction component 1335 may begin processing audio data starting at the beginpoint and ending at the endpoint. Further, audio frames during the spoken user input that do not include speech may be filtered out by the VAD component 1325 and thus not considered by the ASR feature extraction component 1345 and/or the user recognition feature extraction component 1335. The resulting accumulated/processed speech audio data (from beginpoint to endpoint) may then be represented in a single feature vector for the user recognition feature vector data 1340, which may then be used for user recognition processing.

Figure 15:
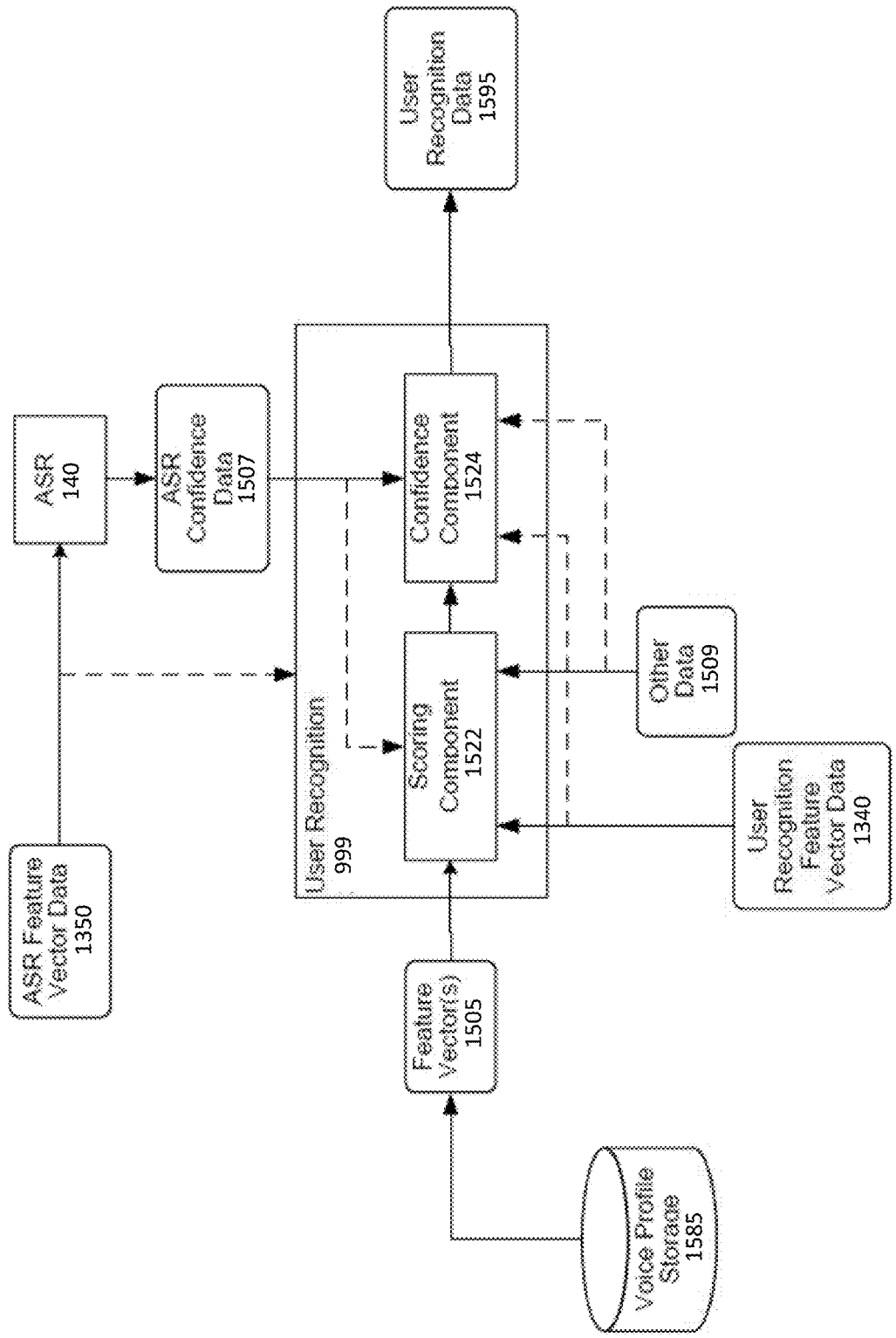
FIG. 15 is a system flow diagram illustrating user recognition according to embodiments of the present disclosure.

FIG. 15 illustrates user recognition processing as may be performed by a user recognition engine 999. The ASR component 140 performs ASR processing on the ASR feature vector data 1350 as described above. ASR confidence data 1507 may be passed to the user recognition engine 999.

The user recognition engine 999 performs user recognition using various data including the user recognition feature vector data 1340, feature vectors 1505 representing explicit and/or anonymous voice profiles, the ASR confidence data 1507, and other data 1509. The user recognition engine 999 may output the user recognition data 1595, which reflects a certain confidence that the user input was spoken by one or more particular users. The user recognition data 1595 may include one or more user identifiers (e.g., corresponding to one or more explicit voice profiles and/or one or more anonymous voice profiles). Each user identifier in the user recognition data 1595 may be associated with a respective confidence value, representing a likelihood that the user input corresponds to the user identifier. A confidence value may be a numeric or binned value.

The feature vector(s) 1505 input to the user recognition engine 999 may correspond to one or more anonymous voice profiles and/or one or more explicit voice profiles. The user recognition engine 999 may use the feature vector(s) 1505 to compare against the user recognition feature vector 1340, representing the present user input, to determine whether the user recognition feature vector 1340 corresponds to one or more of the feature vectors 905 of the anonymous and/or explicit voice profiles.

Each feature vector 1505 may be the same size as the user recognition feature vector 1340. For example, if the user recognition feature vector 1304 is of size F (for example encoded by the encoder 1450), a feature vector 1505 may also be of size F.

To perform user recognition, the user recognition engine 999 may determine the device 102 from which the audio data 1311 originated. For example, the audio data 1311 may be associated with metadata including a device identifier representing the device 102. Either the device 102 or the system(s) may generate the metadata. The system(s) may determine a group profile identifier associated with the device identifier, may determine user identifiers associated with the group profile identifier, and may include the group profile identifier and/or the user identifiers in the metadata. The system(s) may associate the metadata with the user recognition feature vector 1340 produced from the audio data 1311. The user recognition engine 999 may send a signal to the voice profile storage 1585, with the signal requesting only audio data and/or feature vectors 1505

(depending on whether audio data and/or corresponding feature vectors are stored) associated with the device identifier, the group profile identifier, and/or the user identifiers represented in the metadata. This limits the universe of possible feature vectors 1505 the user recognition engine 999 considers at runtime and thus decreases the amount of time to perform user recognition processing by decreasing the amount of feature vectors 1505 needed to be processed. Alternatively, the user recognition engine 999 may access all (or some other subset of) the audio data and/or feature vectors 1505 available to the user recognition engine 999. However, accessing all audio data and/or feature vectors 1505 will likely increase the amount of time needed to perform user recognition processing based on the magnitude of audio data and/or feature vectors 1505 to be processed.

If the user recognition engine 999 receives audio data from the voice profile storage 1585, the user recognition engine 999 may generate one or more feature vectors 1505 corresponding to the received audio data.

The user recognition engine 999 may attempt to identify the user that spoke the speech represented in the audio data 1311 by comparing the user recognition feature vector 1340 to the feature vector(s) 1505. The user recognition engine 999 may include a scoring component 1522 that determines respective scores indicating whether the user input (represented by the user recognition feature vector 1340) was spoken by one or more particular users (represented by the feature vector(s) 1505). The user recognition engine 999 may also include a confidence component 1524 that determines an overall accuracy of user recognition processing (such as those of the scoring component 1522) and/or an individual confidence value with respect to each user potentially identified by the scoring component 1522. The output from the scoring component 1522 may include a different confidence value for each received feature vector 1505. For example, the output may include a first confidence value for a first feature vector 1505a (representing a first anonymous or explicit voice profile), a second confidence value for a second feature vector 1505b (representing a second anonymous or explicit voice profile), etc. Although illustrated as two separate components, the scoring component 1522 and the confidence component 1524 may be combined into a single component or may be separated into more than two components.

The scoring component 1522 and the confidence component 1524 may implement one or more trained machine learning models (such neural networks, classifiers, etc.) as known in the art. For example, the scoring component 1522 may use probabilistic linear discriminant analysis (PLDA) techniques. PLDA scoring determines how likely it is that the user recognition feature vector 740 corresponds to a particular feature vector 1505. The PLDA scoring may generate a confidence value for each feature vector 1505 considered and may output a list of confidence values associated with respective user identifiers, anonymous voice profile identifiers, and/or explicit voice profile identifiers. The scoring component 1522 may also use other techniques, such as GMMs, generative Bayesian models, or the like, to determine confidence values.

The confidence component 1524 may input various data including information about the ASR confidence 1507, speech length (e.g., number of frames or other measured length of the user input), audio condition/quality data (such as signal-to-interference data or other metric data), fingerprint data, image data, or other factors to consider how confident the user recognition engine 999 is with regard to the confidence values linking users to the user input. The confidence component 1524 may also consider the confidence values and associated identifiers output by the scoring component 1522. For example, the confidence component 1524 may determine that a lower ASR confidence 1507, or poor audio quality, or other factors, may result in a lower confidence of the user recognition engine 999. Whereas a higher ASR confidence 1507, or better audio quality, or other factors, may result in a higher confidence of the user recognition engine 999. Precise determination of the confidence may depend on configuration and training of the confidence component 1524 and the model(s) implemented thereby. The confidence component 1524 may operate using a number of different machine learning models/techniques such as GMM, neural networks, etc. For example, the confidence component 1524 may be a classifier configured to map a score output by the scoring component 1522 to a confidence value.

The user recognition engine 999 may output user recognition data 1595 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition engine 999 may output user recognition data 1595 with respect to each received feature vector 1505. The user recognition data 1595 may include numeric confidence values (e.g., 0.0-1.0, 0-1000, or whatever scale the system is configured to operate). Thus the user recognition data 1595 may output an N-best list of potential users with numeric confidence values (e.g., user identifier 123—0.2, anonymous voice profile identifier 234—0.8). Alternatively or in addition, the user recognition data 1595 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition engine 999 may output an N-best list of potential users with binned confidence value (e.g., user identifier 123—low, anonymous voice profile identifier 234—high). Combined binned and numeric confidence value outputs are also possible. Rather than a list of identifiers and their respective confidence values, the user recognition data 1595 may only include information related to the top scoring identifier as determined by the user recognition engine 999. The user recognition engine 999 may also output an overall confidence value that the individual confidence values are correct, where the overall confidence value indicates how confident the user recognition engine 999 is in the output results. The overall confidence value may be determined by the confidence component 1524.

The confidence component 1524 may determine differences between individual confidence values when determining the user recognition data 1595. For example, if a difference between a first confidence value and a second confidence value is large, and the first confidence value is above a threshold confidence value, then the user recognition engine 999 395 is able to recognize a first user (associated with the feature vector 1505 associated with the first confidence value) as the user that spoke the user input with a much higher confidence than if the difference between the confidence values were smaller.

The user recognition engine 999 may perform thresholding to avoid incorrect user recognition data 1595 being output. For example, the user recognition engine 999 may compare a confidence value output by the confidence component 1524 to a threshold confidence value. If the confidence value does not satisfy (e.g., does not meet or exceed) the threshold confidence value, the user recognition engine 999 may not output user recognition data 1595, or may only include in that data 1595 an indicator that a user speaking the user input could not be recognized. Further, the user recognition engine 999 may not output user recognition data 1595 until enough user recognition feature vector data 1540 is accumulated and processed to verify a user above a threshold confidence value. Thus the user recognition engine 999 may wait until a sufficient threshold quantity of audio data of the user input has been processed before outputting user recognition data 1595. The quantity of received audio data may also be considered by the confidence component 1524.

The user recognition engine 999 may be defaulted to output binned (e.g., low, medium, high) user recognition confidence values. However, such may be problematic in certain situations. For example, if the user recognition engine 999 computes a single binned confidence value for multiple feature vectors 1505, the system may not be able to effectively determine which user originated the user input. In this situation, the user recognition engine 999 may be configured to override its default setting and output numeric confidence values. This enables the system to determine a user, associated with the highest numeric confidence value, originated the user input.

The user recognition engine 999 may use other data 1509 to inform user recognition processing. A trained model(s) or other component of the user recognition engine 999 may be trained to take other data 1509 as an input feature when performing user recognition processing. Other data 1509 may include a variety of data types depending on system configuration and may be made available from other sensors, devices, or storage. The other data 1509 may include a time of day at which the audio data 1311 was generated by the device 102 or received from the device 102, a day of a week in which the audio data audio data 1311 was generated by the device 102 or received from the device 102, etc.

The other data 1509 may include image data or video data. For example, facial recognition may be performed on image data or video data received from the device 102 from which the audio data 1311 was received (or another device). Facial recognition may be performed by the user recognition engine 999, or another component of the system(s). The output of facial recognition processing may be used by the user recognition engine 999. That is, facial recognition output data may be used in conjunction with the comparison of the user recognition feature vector 1340 and one or more feature vectors 1505 to perform more accurate user recognition processing.

The other data 1509 may include location data of the device 102. The location data may be specific to a building within which the device 102 is located. For example, if the device 102 is located in user A's bedroom, such location may increase a user recognition confidence value associated with user A and/or decrease a user recognition confidence value associated with user B.

The other data 1509 may include data indicating a type of the device 102. Different types of devices may include, for example, a smart watch, a smart phone, a tablet computer, and a vehicle. The type of the device 102 may be indicated in a profile associated with the device 102. For example, if the device 102 from which the audio data 1311 was received is a smart watch or vehicle belonging to a user A, the fact that the device 102 belongs to user A may increase a user recognition confidence value associated with user A and/or decrease a user recognition confidence value associated with user B.

The other data 1509 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 1311 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 102. The global coordinates and associated locations may also or alternatively be associated with one or more user profiles.

The other data 1509 may include data representing activity of a particular user that may be useful in performing user recognition processing. For example, if a user has recently entered a code to disable a home security alarm, and the audio data 1311 was received from a device 102 represented in a group profile associated with the home, signals from the home security alarm about the disabling user, time of disabling, etc. may be reflected in the other data 1509 and considered by the user recognition engine 999. If a mobile device (such as a smart phone, Tile, dongle, or other device) known to be associated with a particular user is detected proximate to (for example physically close to, connected to the same WiFi network as, or otherwise nearby) the device 102, this may be reflected in the other data 1509 and considered by the user recognition engine 999.

Depending on system configuration, the other data 1509 may be configured to be included in the user recognition feature vector data 1340 (for example using the encoder 1450) so that all the data relating to the user input to be processed by the scoring component 1522 may be included in a single feature vector. Alternatively, the other data 1509 may be reflected in one or more different data structures to be processed by the scoring component 1522.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) may be configured to update voice profiles during offline operations. Such voice profile updating may use audio data representing previous spoken user inputs, which were not requested by the system(s).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system, comprising:
one or more processors; and
non-transitory computer-readable media storing computer-executable instructions that, when executed by the one or more processors, cause the one or more processors to perform operations comprising:
receiving, from a voice interface device, first audio data representing a first user utterance from a first user;
determining, from the first audio data, that the first user utterance indicates a request to associate first account data with the voice interface device, the voice interface device associated with second account data of a second user;
sending, to a first user device associated with the first account data, first message data requesting confirmation that the first account data is to be associated with the voice interface device;
receiving, from the first user device, first data confirming the first account data is to be associated with the voice interface device;
causing, in response to the first data, the first account data to be associated with the voice interface device;
sending, to a second user device associated with the second account data, second message data indicating that the first account data has been associated with the voice interface device;
receiving, from the second user device, second data confirming the first account data is authorized to be associated with the voice interface device; and
causing an association between the first account data and the voice interface device to be maintained in response to receiving the second data.

2. The system of claim 1, the operations further comprising:
receiving request data to perform an action by an electronic device associated with the first account data;
determining, utilizing the first account data, device identifier data indicating electronic devices associated with the first account data;
sending, to the electronic device, the device identifier data indicating that the electronic device is a candidate device for performing the action;
receiving third data indicating the action to be performed and the electronic device of the electronic devices to perform the action; and
causing the electronic device to perform the action.

3. The system of claim 1, the operations further comprising:
receiving, from the voice interface device, second audio data representing a second user utterance;
determining intent data indicating that the second user utterance is requesting content associated with an application;
determining that the second user utterance is associated with the first account data instead of the second account data;
determining that the application is associated with the first account data; and
sending a command to the voice interface device to output the content.

4. The system of claim 1, the operations further comprising:
receiving, while the first account data is associated with the voice interface device, input data from the first user device, the input data requesting that subsequent association with the first account data and the voice interface device be enabled without device re-authentication;
generating, in response to receiving the input data, third data indicating that association with the first account data and the voice interface device be enabled without device re-authentication;
storing the third data in association with the first account data;
receiving, from the voice interface device, second audio data representing a second user utterance to associate the first account data with the voice interface device;
determining that the second user utterance is associated with the first account data; and
causing the first account data to be associated with the voice interface device without device re-authentication.

5. A method, comprising:
receiving, from a first device, first audio data representing a first user utterance;
determining, based at least in part on the first audio data, that the first user utterance indicates a request to associate first account data with the first device, the first device associated with second account data;
sending, to a second device associated with the first account data, first request data for first data indicating that the first account data is authorized to be associated with the first device;
receiving the first data from the second device;

causing, based at least in part on the first data, the first account data to be associated with the first device;
sending, to a third device associated with the second account data, second request data indicating that the first account data has been associated with the first device;
receiving, from the third device, second data confirming the first account data is authorized to be associated with the first device; and
causing an association between the first account data and the first device to be maintained based at least in part on the second data.

6. The method of claim 5, further comprising:
receiving third request data to perform an action by an electronic device associated with the first account data;
determining, based at least in part on the first account data, device identifier data indicating electronic devices associated with the first account data;
sending, to the electronic device, the device identifier data indicating that the electronic device is a candidate device for performing the action;
receiving third data indicating the action to be performed and the electronic device of the electronic devices to perform the action; and
causing the electronic device to perform the action.

7. The method of claim 5, further comprising:
receiving, from the first device, second audio data representing a second user utterance;
determining intent data indicating that the second user utterance is requesting content associated with an application;
determining that the second user utterance is associated with the first account data instead of the second account data;
determining that the application is associated with the first account data; and
sending a command to the first device to output the content.

8. The method of claim 5, further comprising:
receiving, while the first account data is associated with the first device, input data from the second device, the input data requesting that subsequent association between the first account data and the first device be enabled without device re-authentication;
generating, based at least in part on receiving the input data, third data indicating that association between the first account data and the first device be enabled without device re-authentication;
storing the third data in association with the first account data;
receiving, from the first device, second audio data representing a second user utterance to associate the first account data with the first device;
determining that the second user utterance is associated with the first account data; and
causing the first account data to be associated with the first device without device re-authentication.

9. The method of claim 5, further comprising:
receiving, while the first account data is associated with the first device, input data from the second device, the input data requesting that subsequent association between the first account data and the first device be enabled when the second device is connected to a network access point associated with the first device;
generating, based at least in part on receiving the input data, third data indicating that association between the first account data and the first device be enabled when the second device is connected to the network access point;
storing the third data in association with the first account data;
receiving fourth data indicating that the second device is connected to the network access point; and
causing the first account data to be associated with the first device based at least in part on receiving the second data.

10. The method of claim 5, further comprising:
generating third data indicating that an action has been performed in association with the first account data;
storing the third data in association with a first activity feed associated with the first account data; and
determining to refrain from storing the third data in association with a second activity feed associated with the second account data based at least in part on the action being performed in association with the first account data.

11. The method of claim 5, further comprising:
generating third data indicating that an action has been performed by the first device in association with the first account data while the first account data is associated with the first device;
storing a first instance of the third data in association with a first activity feed associated with the first account data; and
storing a second instance of the third data in association with a second activity feed associated with the second account data based at least in part on the action being performed by the first device.

12. The method of claim 5, further comprising:
determining, based at least in part on the first account data being associated with the first device, first device identifier data indicating first electronic devices associated with the first account data;
determining, based at least in part on receiving the first audio data from the first device, second device identifier data indicating second electronic devices associated with the second account data;
sending, to a system associated with an application configured to cause an action to be performed in response to input data requesting performance of the action, the first device identifier data;
sending, to the system, the second device identifier data; and
receiving, from the system, third data indicating an electronic device of one of the first electronic devices or the second electronic devices to perform the action.

13. A system, comprising:
one or more processors; and
non-transitory computer-readable media storing computer-executable instructions that, when executed by the one or more processors, cause the one or more processors to perform operations comprising:
receiving, from a first device, first audio data representing a first user utterance;
determining, based at least in part on the first audio data, that the first user utterance indicates a request to associate first account data with the first device, the first device associated with second account data;
sending, to a second device associated with the first account data, first request data for first data indicating that the first account data is authorized to be associated with the first device;
receiving the first data from the second device;

sending, to a third device associated with the second account data, second request data for second data indicating that the first account data is authorized to be associated with the first device;

receiving the second data from the third device; and causing, based at least in part on receiving the first data and the second data, the first account data to be associated with the first device.

14. The system of claim 13, the operations further comprising:

receiving third request data to perform an action by an electronic device associated with the first account data;

determining, based at least in part on the first account data, device identifier data indicating electronic devices associated with the first account data;

sending, to the electronic device, the device identifier data indicating that the electronic device is a candidate device for performing the action;

receiving third data indicating the action to be performed and the electronic device of the electronic devices to perform the action; and causing the electronic device to perform the action.

15. The system of claim 13, the operations further comprising:

receiving, from the first device, second audio data representing a second user utterance;

determining intent data indicating that the second user utterance is requesting content associated with an application;

determining that the second user utterance is associated with the first account data instead of the second account data;

determining that the application is associated with the first account data; and sending a command to the first device to output the content.

16. The system of claim 13, the operations further comprising:

receiving, while the first account data is associated with the first device, input data from the second device, the input data requesting that subsequent association between the first account data and the first device be enabled without device re-authentication;

generating, based at least in part on receiving the input data, third data indicating that association between the first account data and the first device be enabled without device re-authentication;

storing the third data in association with the first account data;

receiving, from the first device, second audio data representing a second user utterance to associate the first account data with the first device;

determining that the second user utterance is associated with the first account data; and causing the first account data to be associated with the first device without device re-authentication.

17. The system of claim 13, the operations further comprising:

receiving, while the first account data is associated with the first device, input data from the second device, the input data requesting that subsequent association between the first account data and the first device be enabled when the second device is connected to a network access point associated with the first device;

generating, based at least in part on receiving the input data, third data indicating that association between the first account data and the first device be enabled when the second device is connected to the network access point;

storing the third data in association with the first account data;

receiving fourth data indicating that the second device is connected to the network access point; and causing the first account data to be associated with the first device based at least in part on receiving the second data.

18. The system of claim 13, the operations further comprising:

generating third data indicating that an action has been performed in association with the first account data;

storing the third data in association with a first activity feed associated with the first account data; and determining to refrain from storing the third data in association with a second activity feed associated with the second account data based at least in part on the action being performed in association with the first account data.

19. The system of claim 13, the operations further comprising:

generating third data indicating that an action has been performed by the first device in association with the first account data while the first account data is associated with the first device;

storing a first instance of the third data in association with a first activity feed associated with the first account data; and storing a second instance of the third data in association with a second activity feed associated with the second account data based at least in part on the action being performed by the first device.

20. The system of claim 13, the operations further comprising:

determining, based at least in part on the first account data being associated with the first device, first device identifier data indicating first electronic devices associated with the first account data;

determining, based at least in part on receiving the first audio data from the first device, second device identifier data indicating second electronic devices associated with the second account data;

sending, to a device configured to cause an action to be performed in response to input data requesting performance of the action, the first device identifier data;

sending, to the device, the second device identifier data; and receiving, from the device, third data indicating an electronic device of one of the first electronic devices or the second electronic devices to perform the action.

* * * * *